(12) United States Patent
Hiramatsu

(10) Patent No.: US 7,370,822 B2
(45) Date of Patent: May 13, 2008

(54) SEATBELT RETRACTOR HAVING MULTI-LEVEL LOAD-LIMIT SETTING DEVICES

(75) Inventor: Koji Hiramatsu, Kanzaki-gun (JP)

(73) Assignee: Takata Corporation, Tokyo (JP)

( * ) Notice: Subject to any disclaimer, the term of this patent is extended or adjusted under 35 U.S.C. 154(b) by 215 days.

(21) Appl. No.: 11/116,336

(22) Filed: Apr. 28, 2005

(65) Prior Publication Data

US 2006/0022077 A1   Feb. 2, 2006

(30) Foreign Application Priority Data

| Jul. 28, 2004 | (JP) | ............................. 2004-219934 |
| Oct. 29, 2004 | (JP) | ............................. 2004-316142 |
| Mar. 22, 2005 | (JP) | ............................. 2005-082104 |

(51) Int. Cl.
*B60R 22/34* (2006.01)

(52) U.S. Cl. ................ 242/379.1; 242/381; 242/381.1; 242/382; 280/806; 297/478

(58) Field of Classification Search ................ 242/374, 242/379.1, 381.1, 383.2, 383.5; 280/806; 297/478

See application file for complete search history.

(56) References Cited

U.S. PATENT DOCUMENTS

| 3,985,189 | A |   | 10/1976 | Jahnke et al. |   |
|---|---|---|---|---|---|
| 5,785,269 | A | * | 7/1998 | Miller et al. | .............. 242/379.1 |
| 5,788,177 | A |   | 8/1998 | Keller et al. |   |
| 5,924,641 | A |   | 7/1999 | Keller et al. |   |
| 5,961,060 | A |   | 10/1999 | Brambilla et al. |   |
| 6,012,667 | A | * | 1/2000 | Clancy et al. | ............ 242/379.1 |
| 6,216,972 | B1 |   | 4/2001 | Roehrle |   |
| 6,241,172 | B1 |   | 6/2001 | Fugel et al. |   |
| 6,250,579 | B1 |   | 6/2001 | Bannert et al. |   |
| 6,416,008 | B1 |   | 7/2002 | Fujii et al. |   |
| 6,435,441 | B1 |   | 8/2002 | Kajiyama et al. |   |
| 6,616,081 | B1 |   | 9/2003 | Clute et al. |   |
| 6,698,678 | B2 |   | 3/2004 | Hori et al. |   |
| 6,834,822 | B2 |   | 12/2004 | Koning et al. |   |
| 7,128,343 | B2 |   | 10/2006 | Ingemarsson |   |
| 2003/0021357 | A1 |   | 1/2003 | Korol et al. |   |
| 2004/0129455 | A1 |   | 7/2004 | Koch et al. |   |

(Continued)

FOREIGN PATENT DOCUMENTS

DE   197 80 583 C 1   1/2001

(Continued)

*Primary Examiner*—Peter M. Cuomo
*Assistant Examiner*—Stefan Kruer
(74) *Attorney, Agent, or Firm*—Foley & Lardner LLP

(57) ABSTRACT

A seat belt retractor including a compact brake system configured so that when a drive member of the brake system is inoperative, an operation control member is held in an inoperative position. In this state, rotation stop portions of the operation control member are held in positions opposed to the flat surfaces of an energy-absorbing-member support member, and the energy-absorbing-member support member is braked by the operation control member, whereby the rotation is stopped. When the drive member is activated, the operation control member is moved downward, so that the rotation allowable portion of the operation control member is located on the cylinder of the energy-absorbing-member support member. Then the brake applied to the energy-absorbing-member support member can be released to allow the rotation of the energy-absorbing-member support member.

21 Claims, 18 Drawing Sheets

U.S. PATENT DOCUMENTS

| | | |
|---|---|---|
| 2004/0206844 A1 | 10/2004 | Shiotani et al. |
| 2006/0076448 A1 | 4/2006 | Bell et al. |

FOREIGN PATENT DOCUMENTS

| | | |
|---|---|---|
| EP | 1 405 777 A1 | 4/2004 |
| EP | 1 460 018 A1 | 9/2004 |
| EP | 1 619 091 A1 | 1/2006 |
| GB | 2 053 053 A | 2/1981 |
| JP | 10-258702 | 9/1998 |
| JP | 11-286259 | 10/1999 |
| JP | 2002-53007 | 2/2002 |
| JP | 2002-53008 | 2/2002 |
| JP | 2003-19945 | 1/2003 |
| JP | 2003-206807 | 7/2003 |
| JP | 2004-249968 | 9/2004 |
| WO | WO 02/062631 A1 | 8/2002 |
| WO | WO 2005/100106 A1 | 10/2005 |

* cited by examiner (a)　　　　(b)

(a)

(b)

(c)

(a)

(b)

SEATBELT RETRACTOR HAVING MULTI-LEVEL LOAD-LIMIT SETTING DEVICES

BACKGROUND

The present invention relates to the technical field of a brake system that controls the rotation of a rotation member, the technical field of a seatbelt retractor for retracting a seatbelt extractably and having an energy absorption mechanism (hereinafter, referred to as an EA mechanism) for absorbing impactive energy to the occupant, with the seatbelt in a fastened state, by limiting a load applied to the seatbelt by torsional deformation of a torsion bar when high deceleration is applied to a vehicle in an emergency such as a crash, and the technical field of a seatbelt system having the seatbelt retractor.

Seatbelt systems generally mounted to vehicles such as cars prevent occupants from flying out of seats by restraining the occupants with seatbelts in an emergency, thereby protecting the occupants.

Such seatbelt systems have a seatbelt retractor for retracting a seatbelt. With such seatbelt retractors, seatbelts are retracted around a spool when not fastened but, when fastened, they are extracted and worn on the occupants. In the emergency described above, the locking mechanism of the seatbelt retractors is activated to prevent the rotation of the spool in the belt extracting direction, thereby preventing the extraction of the seatbelts. Thus, the seatbelt restrains occupants reliably to protect them in an emergency.

With the conventional seatbelt retractors, the occupants move forward by a large inertial force because of significant vehicle deceleration that is generated when the seatbelts restrain the occupants to protect them in an emergency such as a car crash. Accordingly, the seatbelts are subjected to a great load and so the occupants receive a significant impact from the seatbelts. It is therefore desirable to limit the impact applied to the occupants, although it is not so serious problem for the occupants.

Accordingly, seatbelt retractors have been developed which have a torsion bar to absorb and ease the impactive energy by limiting the load applied to a seatbelt in an emergency in a seatbelt fastened condition. (See, for example, Japanese Unexamined Patent Application Publication No. 2001-58559 (incorporated by reference herein)).

FIG. 21 is a longitudinal sectional view of an example of a seatbelt retractor disclosed in JP 2001-58559. In the drawing, reference numeral 1 denotes a seatbelt retractor; numeral 2, a U-shaped frame; numeral 3, a seatbelt; numeral 4, a spool supported rotationally between both side walls of the frame 2, for retracting the seatbelt 3; numeral 5, deceleration detection means activated by detecting high vehicle deceleration generated in the aforesaid emergency; numeral 6, a locking mechanism activated by the deceleration detection means 5 to prevent at least the rotation of the spool 4 in the belt extracting direction; numeral 7, a torsion bar fitted and passed through with play in the center of the spool 4 in the direction of the axis, for rotationally connecting the spool 4 and the locking mechanism 6; numeral 8, spring means for normally biasing the spool 4 via a bush 10 in the belt retracting direction by the spring force of a spiral spring 9; numeral 11, a pretensioner activated in the emergency to generate a belt retracting torque; and numeral 12, a bush for transmitting the seatbelt retracting torque of the pretensioner 11 to the spool 4.

The locking mechanism 6 has a locking base 14 (corresponding to a locking member of the present invention) which can rotate with a first torque transmission portion 17 of the torsion bar 7 and which retains a pawl 13 such that it can rock, the torsion bar 7 having a lock gear 6a which rotates with the torsion bar 7 under normal conditions and stops at the activation of the deceleration detection means 5 in an emergency to generate relative rotation difference between it and the torsion bar 7 to bring the pawl 13 into engagement with an internal gear 19 on the side wall of the frame 2, thereby stopping the rotation of the locking base 14 in the seatbelt extracting direction. The locking base 14 has a male screw shaft 15. Into the male screw shaft 15, a nut-like stopper 16 which rotates with the spool 4 is screwed.

The torsion bar 7 also has the first torque transmission portion 17 which is in engagement with the locking base 14 such that it cannot rotate relative thereto and has a second torque transmission portion 18 which is in engagement with the spool 4 such that it cannot rotate relative thereto.

The spool 4 is normally biased in the seatbelt retracting direction by the spring force of the spring means 8 via the bush 10, the torsion bar 7, the second torque transmission portion 18 of the torsion bar 7, and a bush 12. A belt retracting torque generated in the pretensioner 11 is transmitted to the spool 4 via the bush 12 during the operation of the pretensioner 11 and thus the spool 4 retracts the seatbelt 3 by a specified amount.

The related-art retractor 1 with such a structure completely retracts the seatbelt 3 by the basing force of the spring means 8 when the seatbelt 3 is not fastened. When the seatbelt 3 is extracted at a normal speed to wear it, the spool 4 rotates in the seatbelt extracting direction to extract the seatbelt 3 smoothly. After a tongue (not shown) which is provided slidably to the seatbelt 3 has been retained in a buckle (not shown) fixed to the vehicle body, the excessively extracted seatbelt 3 is retracted by the spool 4 by the biasing force of the spring means 8 and as such, the seatbelt 3 is fitted in such a degree that applies no feeling of pressure.

The seatbelt retracting torque generated by the pretensioner 11 is transmitted to the spool 4 in the emergency. The spool 4 retracts the seatbelt 3 by a specified amount to firmly restrain the occupant. On the other hand, the deceleration detection means 5 is activated by large deceleration generated in the emergency to activate the locking mechanism 6. In other words, the rotation of the lock gear 6a in the seatbelt extracting direction is stopped by the activation of the deceleration detection means 5, so that the pawl 13 of the locking mechanism 6 is rotated to come into engagement with the internal gear 19 on the side wall of the frame 2. This stops the rotation of the locking base 14 in the seatbelt extracting direction and so, the torsion bar 7 is twisted and only the spool 4 rotates relative to the locking base 14 in the seatbelt extracting direction. Thereafter, the spool 4 rotates in the seatbelt extracting direction while twisting the torsion bar 7. Thus, the load applied to the seatbelt 3 is limited by the torsional torque of the torsion bar 7 and so the impact applied to the occupant is absorbed and eased.

Since the spool 4 rotates relative to the locking base 14, the stopper 16 which rotates with the spool 4 rotates relative to the screwed male screw shaft 15. Thus, the stopper 16 moves toward the locking base 14. When the stopper 16 comes into contact with the locking base 14, further rotation of the stopper 16 is stopped and so the rotation of the spool 4 is also stopped, so that the torsion of the torsion bar 7 stops. Thus, the extraction of the seatbelt 3 is prevented and so the occupant is securely restrained by the seatbelt 3 and the maximum torsion of the torsion bar 7 is limited and so the torsion bar 7 is prevented from being cut off by torsion.

The related-art retractor 1 is constructed such that the locking base 14 of the locking mechanism 6 rotates relative to the lock gear 6a in the seatbelt extracting direction even in sudden extraction of the seatbelt. Accordingly, the pawl 13 of the locking mechanism 6 is brought into engagement with the internal gear 19 on the side wall of the frame 2 to prevent the rotation of the locking base 14. Therefore, the rotation of the spool 4 in the seatbelt extracting direction is prevented via the torsion bar 7 and so the extraction of the seatbelt is stopped.

Furthermore, JP 2001-58559 discloses the retractor 1 in which the limit load (FL) can be switched. Specifically, as shown in FIG. 22, a lock pin 21 of an EA-load switching mechanism 20 normally prevents a locking member 22 from ejecting from a cylinder 23. When the rotation of the locking base in the seatbelt extracting direction is stopped at a great impact when the pretensioner is activated, also the rotation of a gear 24 provided to the locking base in the same direction is stopped. Thus the rotation of a gear 25 which is normally in engagement with the gear 24 is also stopped. Since the seatbelt 3 is extracted by the inertial force of the occupant, the spool 4 continues to rotate in the seatbelt extracting direction. Therefore, a gear 26 provided rotatably with the spool 4 also rotates in the same direction and a gear 27 which is normally in engagement with the gear 26 also rotates.

On the other hand, in the initial stage after the great crash, the locking member 22 is ejected from the cylinder 23 by the spring force of a spring 28 because the lock pin 21 is pushed away by the exhaust gas from the pretensioner. Then a ratchet claw 29a of a lock wheel 29 comes into engagement with the locking member 22, thereby stopping the rotation of the lock wheel 29 in the seatbelt extracting direction. Therefore, a second torsion bar 30 is twisted at the portion of a length η shorter than the entire length θ thereof. Thus, the EA operation by the EA mechanism is started by the torsion of the first torsion bar 7 and the torsion of the portion η of the second torsion bar 30, where FL load F1 at that time is relatively high, as shown in FIG. 23. In the stage following the initial stage, the portion η of the second torsion bar 30 is twisted by a specified amount to be broken. After the second torsion bar 30 has been broken, only the first torsion bar 7 is twisted to allow EA operation, where FL load F2 at that time is lower than that in the initial stage, as shown in FIG. 23. In that way, the FL load is switched to allow the limit road applied to the seatbelt to be set flexibly in various levels depending on the occupant restraint condition with an airbag etc. in an emergency.

However, with the seatbelt retractor 1 disclosed in JP 2001-58559, as described above, the ratchet claw 29a of the lock wheel 29 is brought into engagement with the locking member 22 that has sprung out from the cylinder 23 by the spring force of the spring 28 in the initial stage after the crash, thereby preventing the rotation of the lock wheel 29 in the seatbelt extracting direction. Briefly, the cylinder 23, the locking member 22, the spring 28, and the ratchet claw 29a construct a brake system for stopping the rotation of the lock wheel 29.

However, in this brake system, a relatively large force is applied to the locking member 22 when the ratchet claw 29a comes into engagement with the locking member 22. Therefore, the locking member 22 must be increased in strength and as such, the cylinder 23 and the locking member 22 must be increased in size and also the spring 28 must be increased in spring force, thus posing the problem that the entire brake is increased in size.

Moreover, since the locking member 22 is projected to the rotating lock wheel 29 so that the locking member 22 comes into engagement with the ratchet claw 29a of the lock wheel 29, the locking member 22 is given a relatively high impactive force from the ratchet claw 29a at the engagement. This results in the necessity of increasing the cylinder 23 and the locking member 22 in size.

SUMMARY

In consideration of the above, it is an object of at least one embodiment of the invention to provide a compact brake system. Furthermore, it is object of at least one embodiment of the invention to provide a seatbelt retractor in which the limit load applied to a seatbelt can be varied more flexibly depending on the situation in an emergency by using the brake system according to the invention and a seatbelt system including the same.

A brake system according to an embodiment of the present invention includes a rotation member having at least one flat surface on the outer circumference, an operation control member for controlling the rotation of the rotation member, and a drive member for driving the operation control member. The operation control member includes a rotation stop portion located at the rotation member to come in contact with the flat surface of the rotation member, for stopping the rotation of the rotation member, and a rotation allowable portion provided in a position adjacent to the rotation stop portion and located at the rotation member to allow the rotation of the rotation member.

In another embodiment of the brake system, preferably, the rotation stop portion is a flat surface that stops the rotation of the rotation member by coming into contact with the flat surface when the flat surface of the rotation member is opposed thereto, and the rotation allowable portion is shaped like an arc that allows the rotation of the rotation member when located at the rotation member.

According to yet another embodiment of the present invention, a brake system is provided that preferably includes the rotation member is columnar or cylindrical and has one or two flat surfaces on the outer circumference thereof.

According to an alternative embodiment of the present invention, the rotation member is in the form of a rectangular column or a rectangular cylinder and has at least one flat surface on the outer circumference thereof.

According to yet another alternative embodiment, the brake system, preferably, the operation control member stops the rotation of the rotation member with the rotation stop portion while the operation control member is inoperative and allows the rotation of the rotation member with the rotation allowable portion while the operation control member is operative.

According to a further embodiment of the present invention, the seatbelt retractor may include at least a spool for retracting a seatbelt, a locking mechanism including a locking member that rotates normally with the spool by the transmission of the rotation of the spool via a rotation transmission shaft and stops the rotation in the seatbelt extracting direction in an emergency, and first and second seatbelt-load limit mechanisms for limiting the load applied to the seatbelt when the rotation of the locking member in the seatbelt extracting direction is stopped and the spool rotates relative to the locking member in the seatbelt extracting direction. The first seatbelt-load limit mechanism is one of a load limit mechanism in which a torsion bar disposed between the spool and the locking member and constructing the rotation transmission shaft is twisted into deformation, a load limit mechanism in which a wire rod provided on one of the spool side and the locking member side is rubbed with an engage pin provided on the other of the spool side and the locking member side, a load limit mechanism in which a belt-like plate one end of which is provided on one of the spool side and the locking member side is forced to be deformed by a guide groove provided on the other of the spool side and the locking member side, a load limit mechanism in which a cylinder provided on one of the spool side and the locking member side is elastically deformed by a retaining portion provided on the other of the spool side and the locking member side, a load limit mechanism in which a U-shaped flat plate material or a U-shaped wire rod is deformed, one end of which is provided on one of the spool side and the locking member side and the other end is in engagement with the other of the spool side and the locking member side, a load limit mechanism in which a shear pin provided between the spool and the locking member is sheared, an EA mechanism in which a portion provided on one of the spool side and the locking member side is cut with a cutting edge provided on the other of the spool side and the locking member side, and a load limit mechanism in which a plate-like energy absorbing member provided on one of the spool side and the locking member side is cut with a cutting projection provided on the other of the spool side and the locking member side. The second seatbelt-load limit mechanism is provided on a rotation shaft that is rotated by the rotation of the spool in an emergency. The second seatbelt-load limit mechanism includes limit-load setting means for setting a limit load for the seatbelt and limit-load control means for controlling the limit-load setting means so as to vary the limit load of the seatbelt in an emergency depending on the situation of the emergency. The limit-load setting means includes a first energy-absorbing-member support member provided on the rotation shaft such that it can rotate therewith, a second energy-absorbing-member support member provided on the rotation shaft such that it can rotate relative thereto, an energy absorbing member disposed between the first and second energy-absorbing-member support members, for absorbing energy during the relative rotation of the first and second energy-absorbing-member support members, and a brake system that controls the rotation of the second energy-absorbing-member support member. In an alternative embodiment, the brake system is the brake system according to an embodiment of the present invention, and the second energy-absorbing-member support member is the rotation member.

According to another alternative embodiment, the limit-load setting means includes two first and second limit-load setting means of different limit loads.

In an alternative embodiment, the drive member includes a gas generator for activating the operation control member. Furthermore, the limit-load setting means may include two first and second limit-load setting means of different limit loads and one of the first and second limit-load setting means may be configured so that the load setting means may always be activated in an emergency.

In the seatbelt retractor described above, preferably, the drive member of the other of the first and second limit-load setting means includes a gas generator for activating the operation control member.

With the brake system of the invention with such a structure, the rotation of the rotation member may be stopped in such a way that the rotation stop portion of the operation control member is located on the rotation member into contact with the flat surface thereof and the rotation allowable portion of the operation control member is located on the rotation member to allow the rotation thereof. Accordingly, no large impactive force is applied from the rotation member to the operation control member. Thus, the strength of the operation control member can be made smaller and so the brake system can be decreased in size.

According to an embodiment of the invention, the rotation of the operation control member is stopped by the rotation stop portion while the operation control member is inoperative and the rotation of the operation control member is allowed by the rotation allowable portion while the operation control member is operative. Accordingly, no large impactive force is applied from the rotation member to the operation control member. This can also reduce the strength and size of the operation control member.

The seatbelt retractor and the seatbelt system according to an embodiment of the invention includes a suitable number of second seatbelt-load limit mechanisms depending on the vehicle to which the seatbelt retractor is mounted, in which the operation of the second seatbelt-load limit mechanism is controlled according to advance information (occupant's weight information, seat-slide position information, etc.) and information on emergency situation such as crash severity (crash speed, crash situation, etc.). Thus, the limit load of the seatbelt in a crash can be varied more flexibly depending on the situation of the emergency and the occupant's physique. Thus the occupant can be protected more effectively and appropriately in a crash. Particularly, according to one embodiment of the invention, the limit-load setting means includes two first and second limit-load setting means of different limit loads. Accordingly, four EA operation patterns can be set. By the four EA operation patterns, the limit load of the seatbelt in a crash can be set effectively and easily depending on the situation of the emergency and the occupant's physique.

The operation control member may be activated by relatively large force by the gas pressure of the gas generator. This allows reliable switching of the operation of the limit-load setting means.

According to an embodiment of the present invention, one of the first and second limit-load setting means can always be activated in an emergency. Thus, the drive member for activating the limit-load setting means can be omitted. This can reduce the number of components and so simplifies the structure and decreases the cost.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 4 schematically shows an EA mechanism, an operation control member, and a drive member with the gas generator is in an inoperative state, in which FIG. 4(a) is a left side view, FIG. 4(b) is a front view thereof, FIG. 4(c) is a right side view of the EA mechanism in an inoperative state, and FIG. 4(d) is a right side view of the EA mechanism after EA operation has completed.

FIG. 5 shows energy absorbing members, in which FIG. 5(a) is a front view thereof, FIG. 5(b) is a plan view of one energy absorbing member, FIG. 5(c) is a plan view of the other energy absorbing member, and FIG. 5(d) is a plan view of a modification of the energy absorbing member.

FIG. 6 shows an energy-absorbing-member support member, in which FIG. 6(a) is a side view and FIG. 6(b) is a partially cut-away front view thereof.

FIG. 8 schematically shows the EA mechanism, the operation control member, and the drive member with the gas generator is in an operative state, in which FIG. 8(a) is a left side view, FIG. 8(b) is a front view, and FIG. 8(c) is a right side view of the EA mechanism in an inoperative state.

FIG. 15 is a schematic diagram of a brake system according to another embodiment of the invention, wherein FIG. 15(a) is a cross-sectional view taken along line XVA-XVA of FIG. 15(b), with the gas generator in an inoperative state, FIG. 15(b) is a front view of the brake system with the gas generator in an inoperative state, FIG. 15(c) is a cross-sectional view taken along line XVC-XVC of FIG. 15(d), with the gas generator in an operative state, and FIG. 15(d) is a front view of the brake system with the gas generator in an operative state.

FIG. 16 schematically shows the operation control member and the drive member according to the embodiment of FIG. 15, in which FIG. 16(a) is a side view and FIG. 16(b) is a cross-sectional view taken along XVIB-XVIB of FIG. 16(a).

DETAILED DESCRIPTION

Figure 1:
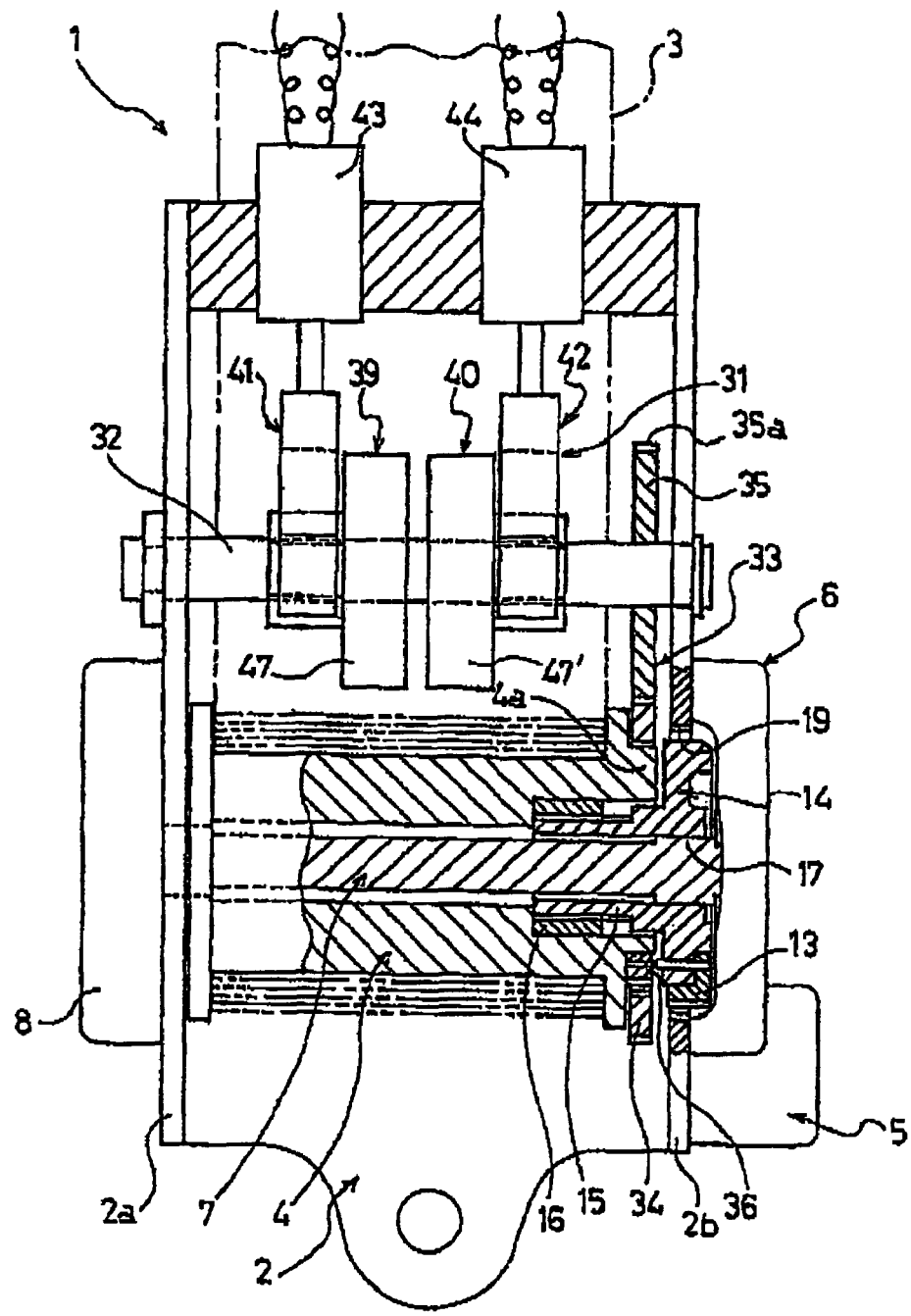
FIG. 1 is a schematic front view of a seatbelt retractor including a brake system according to an embodiment of the present invention, parts being broken away.

FIG. 1 is a schematic front view of a seatbelt retractor including a brake system according to an embodiment of the present invention, parts being broken away. In the description of the following embodiments, the same components as those of the previous embodiments and the related-art seatbelt retractor 1 shown in FIG. 21 are given the same reference numerals and their detailed description will be omitted.

Figure 21:
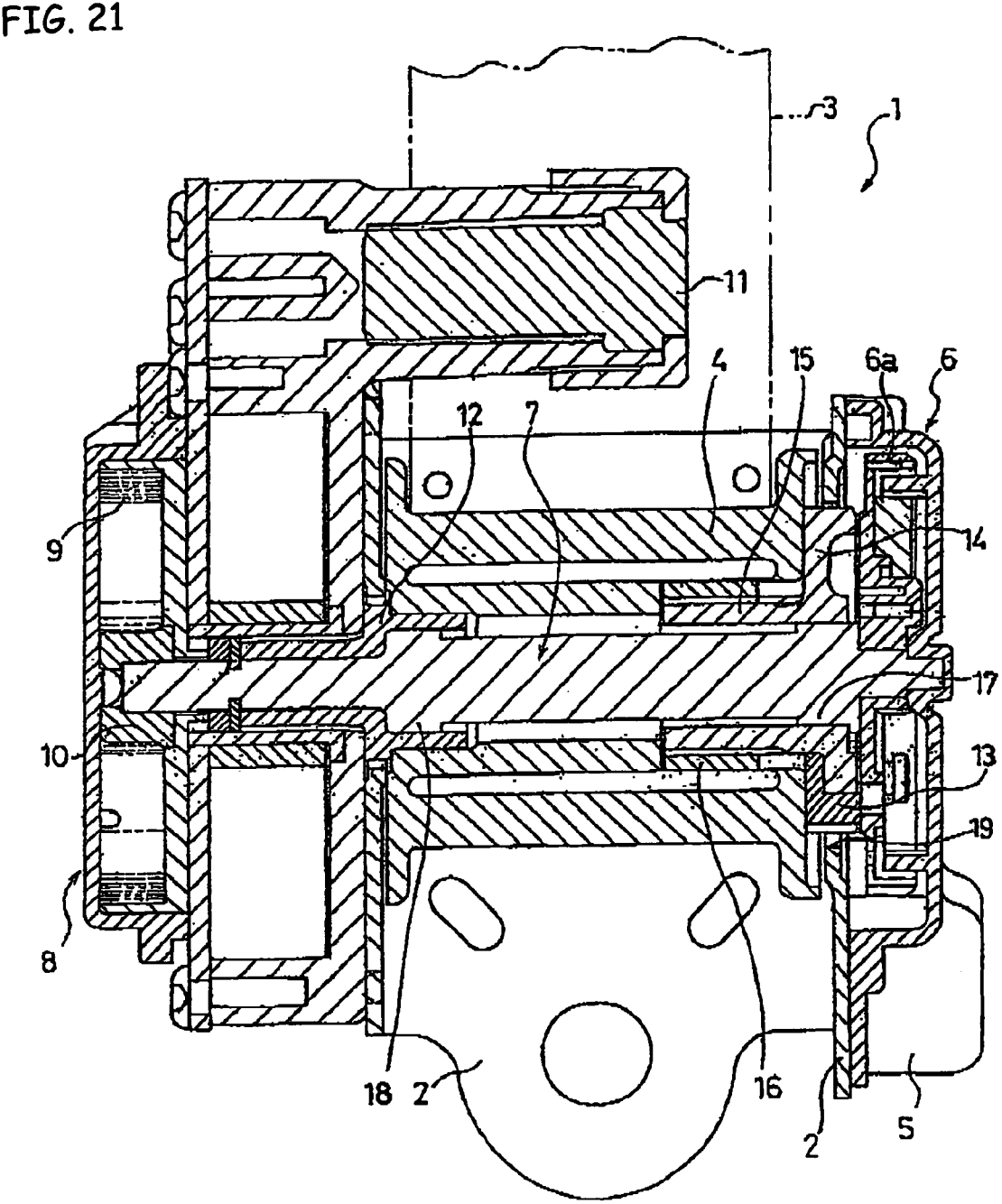
FIG. 21 is a longitudinal sectional view of an example of a seatbelt retractor including a torsion bar.

As shown in FIG. 1, the seatbelt retractor 1 of this embodiment includes the U-shaped frame 2, the seatbelt 3, the spool 4 for retracting the seatbelt 3, and the torsion bar 7 (corresponding to a first seatbelt-load limit mechanism) 7, as with the related-art seatbelt retractor 1 shown in FIG. 21. Although not shown in detail, the seatbelt retractor 1 of this embodiment includes the deceleration detection means 5, the locking mechanism 6, and the spring means 8, as with the conventional seatbelt retractor 1 shown in FIG. 21, and a pretensioner similar to the pretensioner 11 and a bush similar to the bush 12 for transmitting the seatbelt retracting torque of the pretensioner to the spool 4.

The seatbelt retractor 1 of this embodiment further includes a programmable force limiter (hereinafter, also referred to as a PFL) 31. The PFL 31 is disposed above the spool 4 and fixed to the frame 2.

The PFL 31 sets the limit load (FL load) of the seatbelt in a crash more flexibly and variously by varying the FL load of the seatbelt in a crash depending on information on the situation of the crash (emergency), such as advance information (e.g., occupant's weight information, seat-slide position information) and crash severity information (e.g., crash speed information and crash situation information).

The PFL 31 includes a rotation shaft 32 which is supported rotatably between both-side walls 2a and 2b of the U-shaped frame 2 such that it is in parallel with the spool 4 and the torsion bar 7. The rotation shaft 32 can be rotatably connected to the spool 4 via a gear-power transmission mechanism 33. The gear-power transmission mechanism 33 includes a spool-side gear 34 mounted to the spool 4 such that it can rotate therewith and is coaxial therewith, a PFL-side gear 35 with a diameter smaller than that of the spool-side gear 34, which is mounted to the rotation shaft 32 such that it can rotate therewith and is coaxial therewith, and a clutch mechanism 36 that rotatably connects the spool 4 and the spool-side gear 34 in an emergency.

Figure 2:
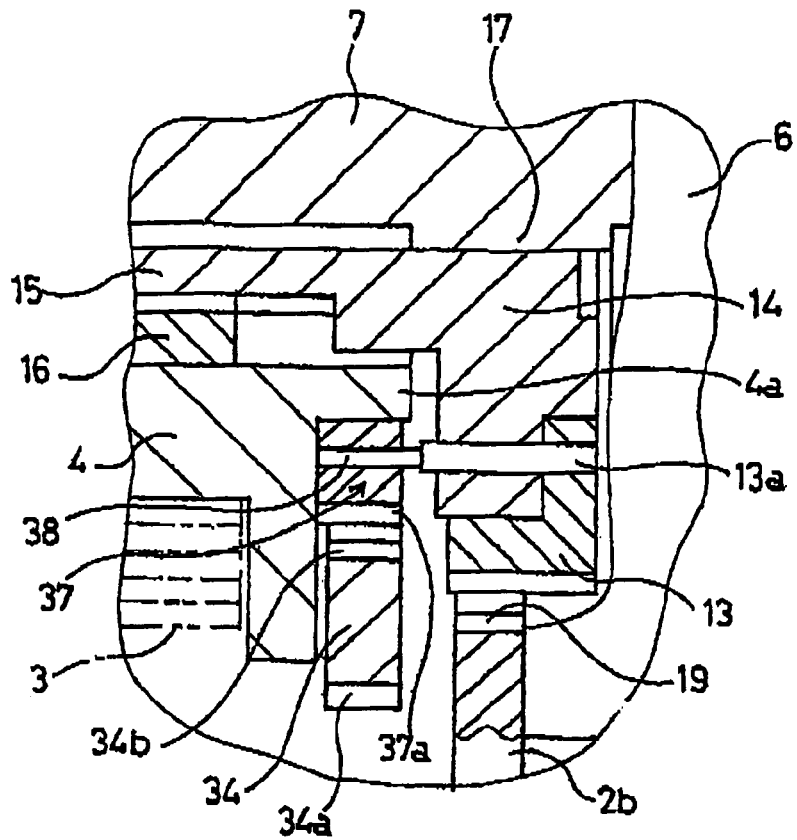
FIG. 2 is an enlarged partial sectional view of a clutch mechanism according to the embodiment of FIG. 1.
Figure 3:
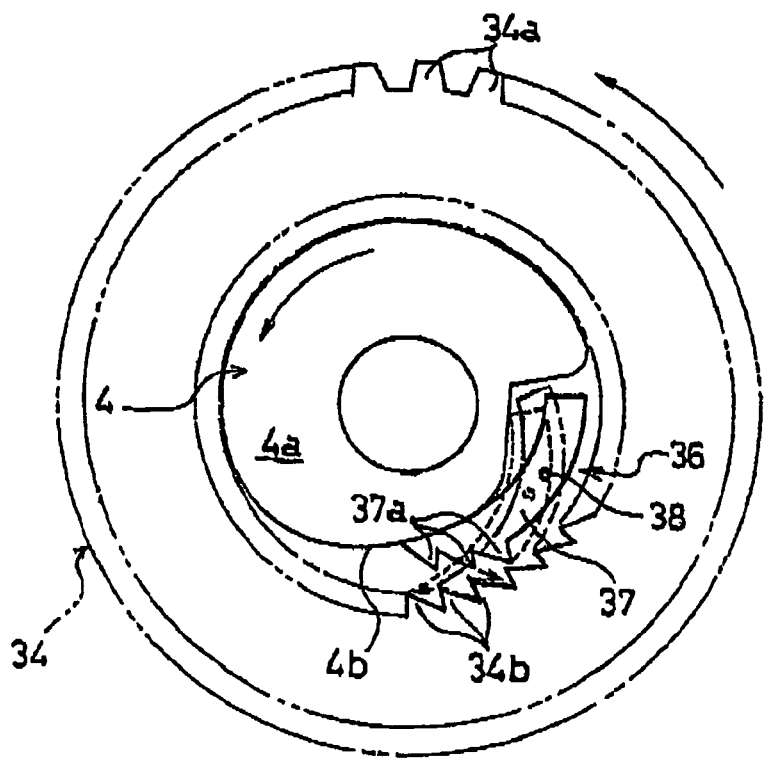
FIG. 3 is an enlarged partial sectional view of a spool-side gear and the clutch mechanism according to the embodiment of FIG. 1.

As shown in FIGS. 2 and 3 in detail, the spool-side gear 34 is shaped like a ring including an external gear 34a and an internal gear 34b. The internal gear 34b is shaped in a ratchet gear engageable in the belt extracting direction. The spool-side gear 34 is supported by the spool 4 such that it can rotate relative thereto in such a way that the internal gear 34b is in contact with a support shaft 4a projecting from the end face of the spool 4 adjacent to the locking base 14.

The clutch mechanism 36 includes an arc-shaped clutch pawl 37 having a predetermined number of engage claws 37a at one end, which can come into engagement with the internal gear 34b of the spool-side gear 34. The clutch pawl 37 is supported slidably by a support surface 4b of the support shaft 4a, the support surface 4b being curved in a specified shape. The clutch pawl 37 can rotate with a shear pin 38 which is provided integrally and coaxially to the rotation shaft 13a of the pawl 13 of the locking mechanism 6. When the pawl 13 rotates in an emergency to stop the rotation of the locking base 14 in the belt extracting direction, the engage claws 37a of the clutch pawl 37 rotate with the pawl 13 to be brought into engagement with the internal gear 34b.

When the pawl 13 rotates in an emergency when the deceleration detection means 5 is activated, to come into engagement with the internal gear 19 on the side wall 2b of the frame 2, the clutch pawl 37 rotates with the pawl 13, so that the engage claws 37a come into engagement with the internal gear 34b of the spool-side gear 34, as indicated by the alternate and long and two short dashes line in FIG. 3, to connect the clutch mechanism 36. By the connection of the clutch mechanism 36, the spool 4 and the spool-side gear 34 are rotatably connected at least in the belt extracting direction. When the pawl 13 comes into engagement with the internal gear 19 of the frame 2, the rotation of the locking base 14 in the belt extracting direction is locked, while the seatbelt 3 is extracted by the inertial force of the occupant to further rotate the spool 4 in the belt extracting direction, so that the shear pin 38 is sheared by a high shear load.

More specifically, when the pawl 13 comes into engagement with the internal gear 19 of the frame 2 and the engage claws 37a of the clutch pawl 37 come into engagement with the internal gear 34b, the shear pin 38 is sheared. When the shear pin 38 is sheared, the clutch pawl 37 moves relative to the spool 4, toward the upstream position of rotation of the spool 4 in the belt extracting direction, with the engage claws 37a in engagement with the internal gear 34b, as indicated by the dotted line of FIG. 3. The clutch pawl 37 is thus brought into engagement between the support surface 4b of the support shaft 4a of the spool 4 and the spool-side gear 34, thereby stopping the movement relative to the spool 4. Thus the rotational connection between the spool 4 and the spool-side gear 34 in the belt extracting direction is firmly retained. Accordingly, as indicated by the arrow in FIG. 3, the rotation of the spool 4 in the belt extracting direction is transmitted to the spool-side gear 34 via the clutch pawl 37, so that the spool-side gear 34 rotates in the belt extracting direction as indicated by the arrow.

As shown in FIG. 1, the external gear 34a of the spool-side gear 34 is normally in engagement with the external gear 35a of the PFL-side gear 35. Accordingly, when the clutch mechanism 36 is in disconnection in which the engage claws 37a of the clutch pawl 37 are out of engagement with the internal gear 34b, the rotation is not transmitted to the spool-side gear 34 even when the spool 4 rotates in the belt extracting direction, so that the spool-side gear 34, the PFL-side gear 35, and the rotation shaft 32 do not rotate. On the other hand, when the clutch mechanism 36 is in connection in which the engage claws 37a of the clutch pawl 37 are in engagement with the internal gear 34b and the shear pin 38 is sheared, the rotation of the spool 4 in the belt extracting direction is transmitted to the spool-side gear 34, so that the spool-side gear 34 rotates in the same direction as the spool 4, while the PFL-side gear 35 and the rotation shaft 32 rotate in the opposite direction from the spool 4.

As shown in FIG. 1, the PFL 31 also includes two first and second EA mechanisms 39 and 40 provided to the rotation shaft 32, first and second operation control members 41 and 42 for controlling the EA operation of the first and second EA mechanisms 39 and 40, respectively, and first and second drive members 43 and 44 fixed to the frame 2, for driving the first and second operation control members 41 and 42, respectively. The first and second EA mechanisms 39 and 40 construct the first and second limit-load setting means of the invention with different limit loads.

The first and second EA mechanisms 39 and 40 have the same structure. The first EA mechanism 39 will be described herein below. As shown in FIGS. 4(a) to 4(d), the first EA mechanism 39 includes an energy absorbing member 45, an energy-absorbing-member support ring 46 (corresponding to the first energy-absorbing-member support member of the invention) fixed to the rotation shaft 32 such that it can rotate therewith, and an energy-absorbing-member support member 47 (corresponding to the second energy-absorbing-member support member of the invention) fixed to the rotation shaft 32 such that it can rotate relatively therewith.

Figure 5:
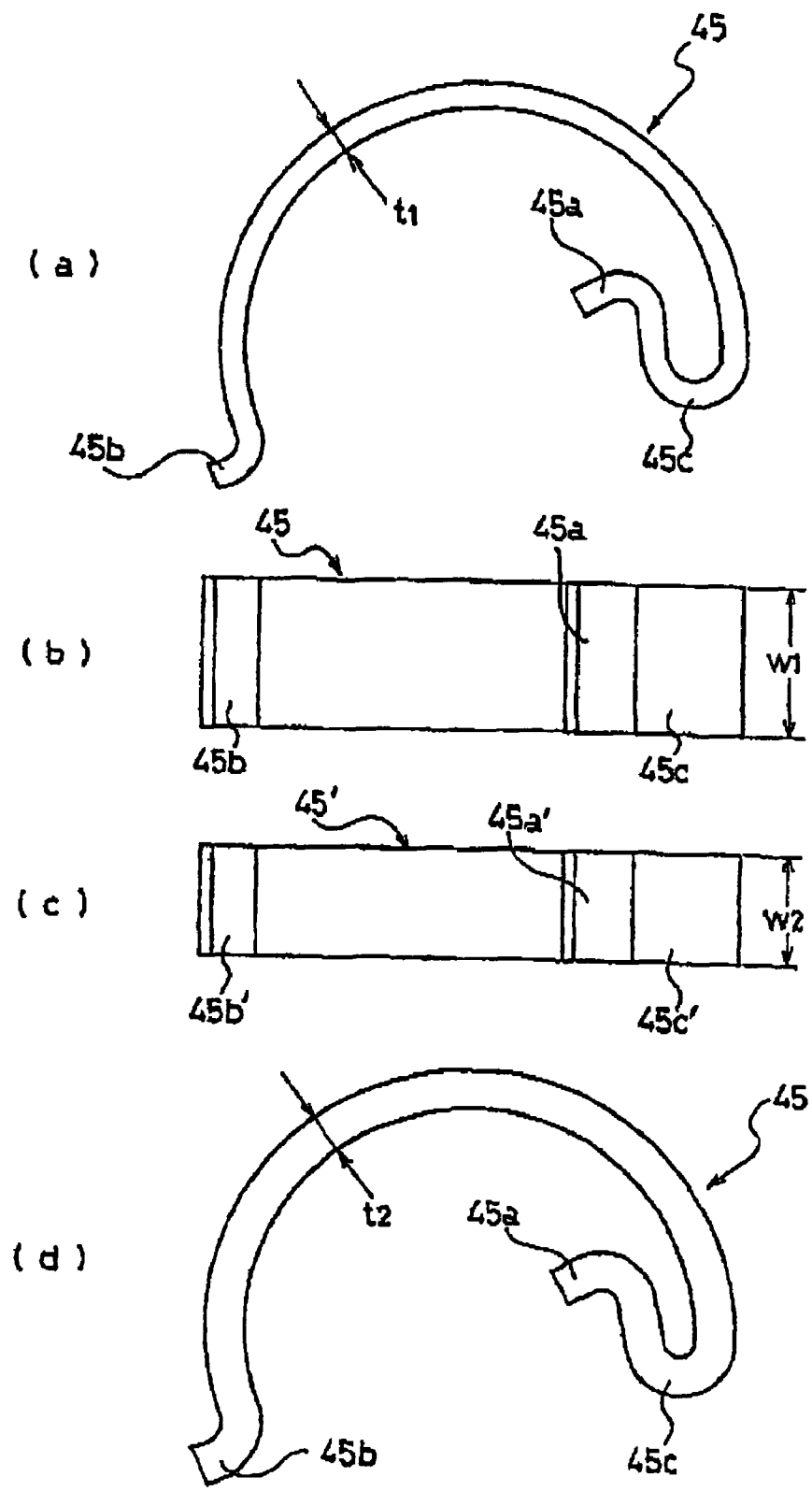

As shown in FIGS. 5(a) and 5(b), the energy absorbing member 45 is made of a belt-like plate with a thickness t1 and a width w1 and is substantially in C-shape entirely. One end of the energy absorbing member 45 serves as a first support portion 45a fixed to the energy-absorbing-member support ring 46, while the other end of the energy absorbing member 45 serves as a second support portion 45b slidably supported by the energy-absorbing-member support member 47. Near the first support portion 45a, a folded U-shaped portion 45c is provided.

Figure 6:
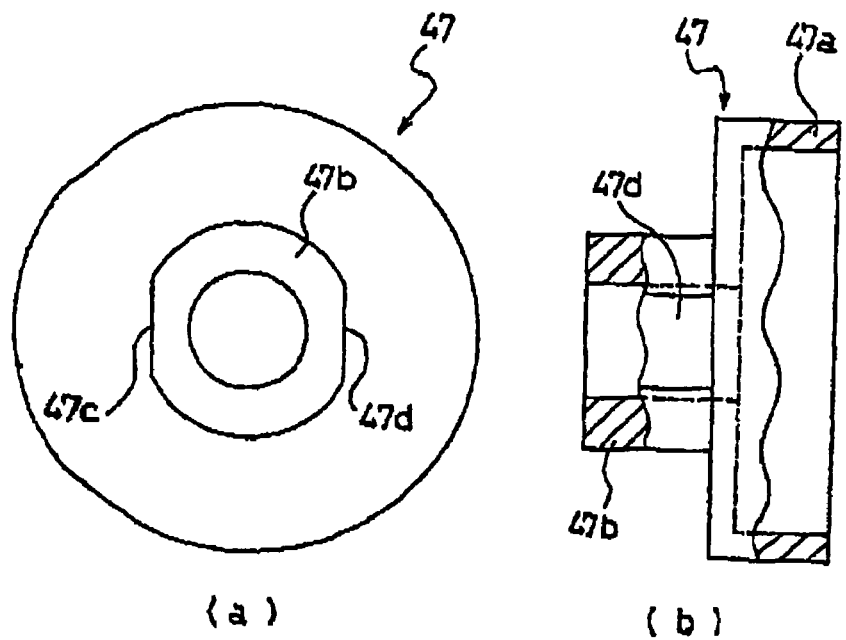

As shown in FIGS. 6(a) and 6(b), the energy-absorbing-member support member 47 includes a closed-end cylinder 47a, which is disposed at one end and has the energy-absorbing-member support ring 46 therein, and a cylinder 47b, which is disposed at the other end and integrated with the closed-end cylinder 47a. A pair of flat surfaces 47c and 47d which are parallel with each other and have the same width are provided on the outer circumference of the cylinder 47b.

Figure 4:
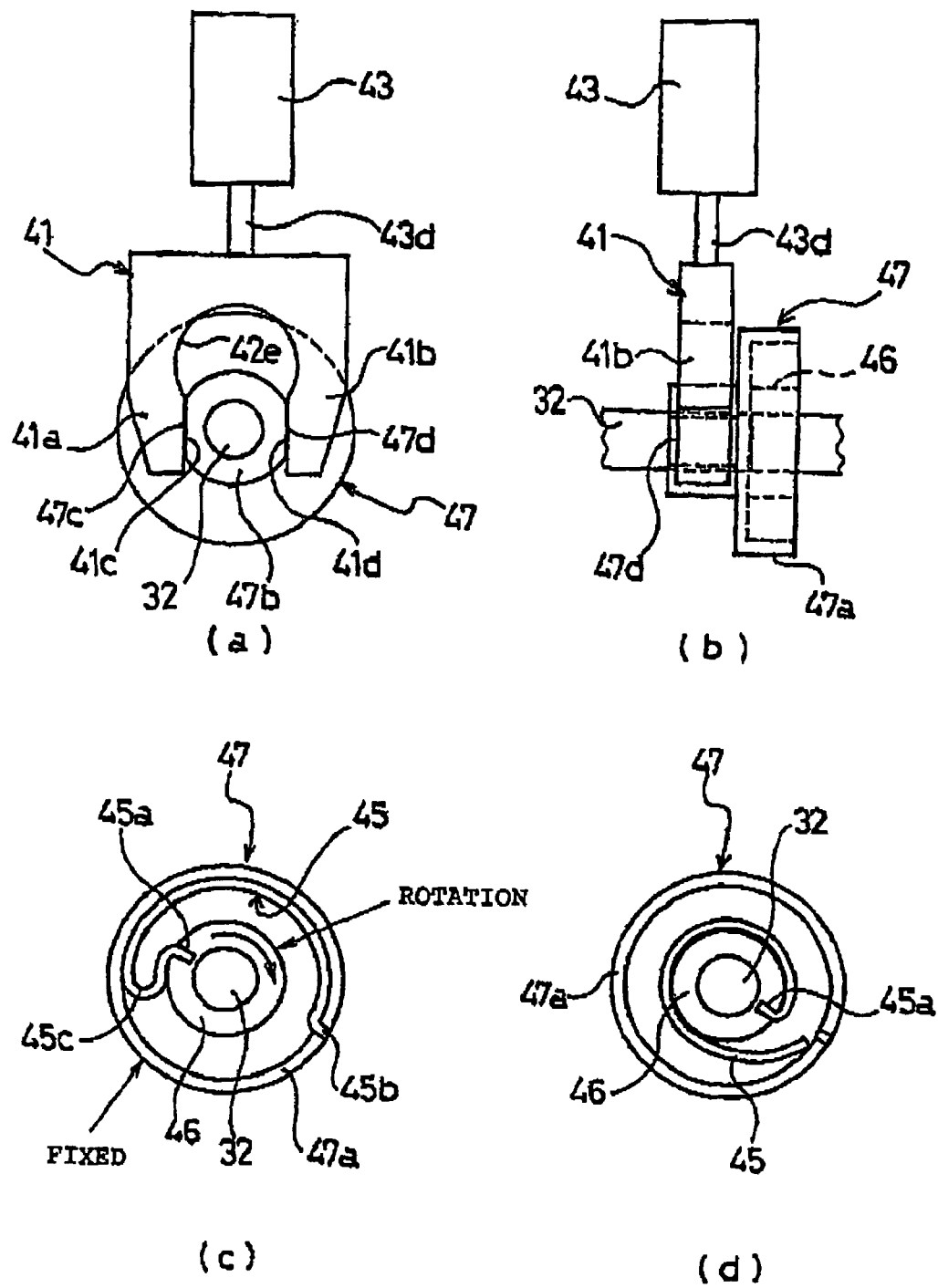

As shown in FIGS. 4(b) and 4(c), the energy-absorbing-member support ring 46 is fixed to the rotation shaft 32 and the energy-absorbing-member support member 47 is relatively rotatably in engagement with the rotation shaft 32 from the left. The energy-absorbing-member support member 47 is positioned axially on the rotation shaft 32, with the energy-absorbing-member support ring 46 disposed in the closed-end cylinder 47a. The first support portion 45a of the energy absorbing member 45 is fixed to the energy-absorbing-member support ring 46, while the second support portion 45b of the energy absorbing member 45 slidably passes through the cylindrical part of the closed-end cylinder 47a of the energy-absorbing-member support member 47.

Also the second EA mechanism 40 has the same structure as the first EA mechanism 39, in other words, includes an energy absorbing member 45', an energy-absorbing-member support ring 46', and an energy-absorbing-member support member 47' supported relatively rotatably by the rotation shaft 32. (Numeral 45' is shown in FIG. 5(c) and numeral 46' is shown in FIG. 1. Numeral 46', which is not shown in any drawings, is used such that it corresponds to the energy-absorbing-member support ring 46 of the first EA mechanism 39 and given the mark "'" to the numeral 46. The components of the second EA mechanism 40 which are not shown in the drawings will be expressed by numerals of corresponding components of the first EA mechanism 39, which are given the mark "'" for the convenience of description.)

Figure 14:
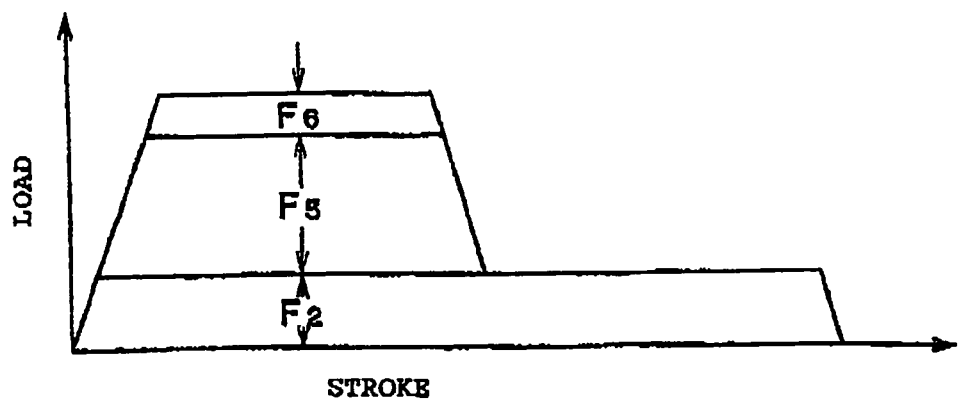
FIG. 14(a) is a graph showing an FL load when two EA mechanisms are operated.
FIG. 14(b) is a graph showing an FL load when one EA mechanism is operated.
FIG. 14(c) is a graph showing an FL load when the other EA mechanism is operated.
Figure 14:
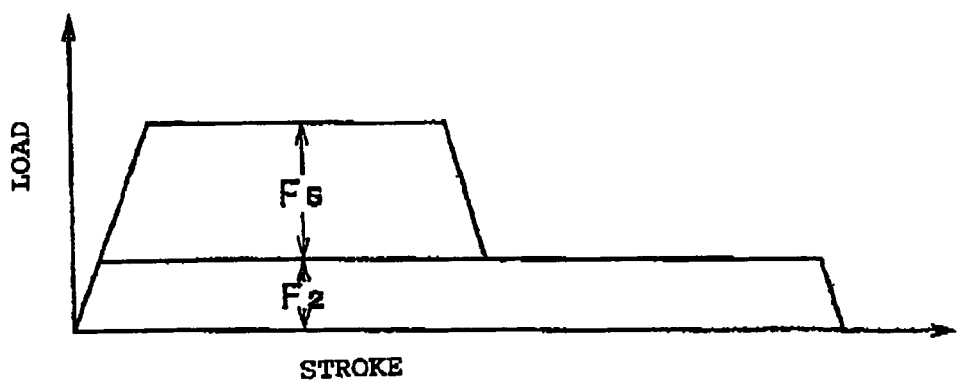
Figure 14:
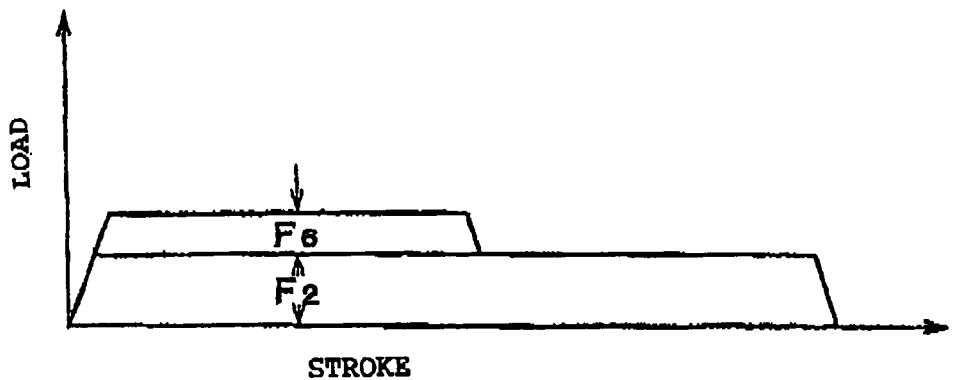

The energy absorbing member 45', the energy-absorbing-member support ring 46', and the energy-absorbing-member support member 47' are disposed on the rotation shaft 32 as in the first EA mechanism 39 such that they are symmetric to those of the first EA mechanism 39. As shown in FIG. 5(c), the thickness of the energy absorbing member 45' is set equal to the thickness t1 of the energy absorbing member 45 of the first EA mechanism 39 but the width w2 is set smaller than the width w1 of the energy absorbing member 45 of the first EA mechanism 39 (w2<w1). Accordingly, the energy absorption of the second EA mechanism 40 is lower than that of the first EA mechanism 39 and the load limit (FL load) of the second EA mechanism 40 is lower than that of the first EA mechanism 39. In short, as shown in FIGS. 14(a) to 14(c), the FL load F5 by the EA operation of the first EA mechanism 39 is relatively high, while the FL load F6 by the EA operation of the second EA mechanism 40 is relatively low.

As shown in FIG. 5(d), to obtain different FL loads, the thickness t2 of the energy absorbing members 45 and 45' can be different from the thickness t1. As shown in the drawings, t2>t1. However, according to different embodiments, t1 may be greater than t2. According to still another alternative embodiment, the width w can be continuously differentiated. The shape of the energy absorbing members 45 and 45' may be others. For the following description, the energy absorbing members 45 and 45' of FIGS. 5(a) to 5(c) will be used.

Figure 7:
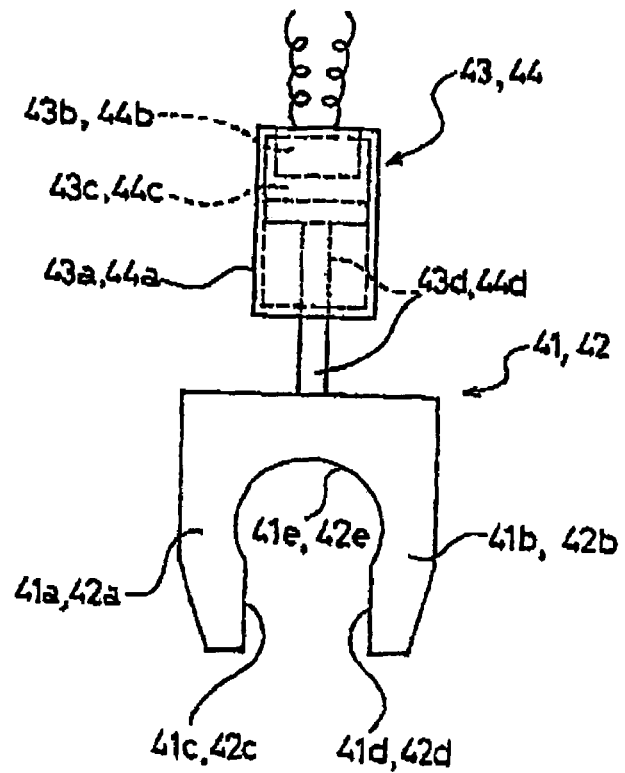
FIG. 7 is a schematic diagram of the operation control member and the drive member.

The first and second operation control members 41 and 42 have the same structure, both of which will be described with reference to FIG. 7. As shown in FIG. 7, the first and second operation control members 41 and 42 are in U-shape including first and second arms 41a and 41b and 42a and 42b, respectively. The opposing surfaces at the respective ends (lower ends in the drawing) of the first and second arms 41a and 41b and 42a and 42b have a pair of rotation stop portions 41c and 41d and 42c and 42d, respectively, which are flat surfaces parallel to each other. The distance between the rotation stop portions 41c and 41d and the distance between the rotation stop portions 42c and 42d are set slightly larger than that between a pair of flat surfaces 47c and 47d of the cylinder 47b in the energy-absorbing-member support members 47 and that between flat surfaces 47c' and 47d' of the cylinder 47b' in the energy-absorbing-member support member 47'. Arc-shaped rotation allowable portions 41e and 42e are provided above the rotation stop portions 41c and 41d and 42c and 42d of the first and second arms 41a and 41b and 42a and 42b such that they are continuously adjacent thereto. The diameters of the rotation allowable portions 41e and 42e are set slightly larger than those of the outer circumferences (other than the flat surfaces 47c and 47d and 47c' and 47d') of the cylinders 47b and 47b'.

Figure 11:
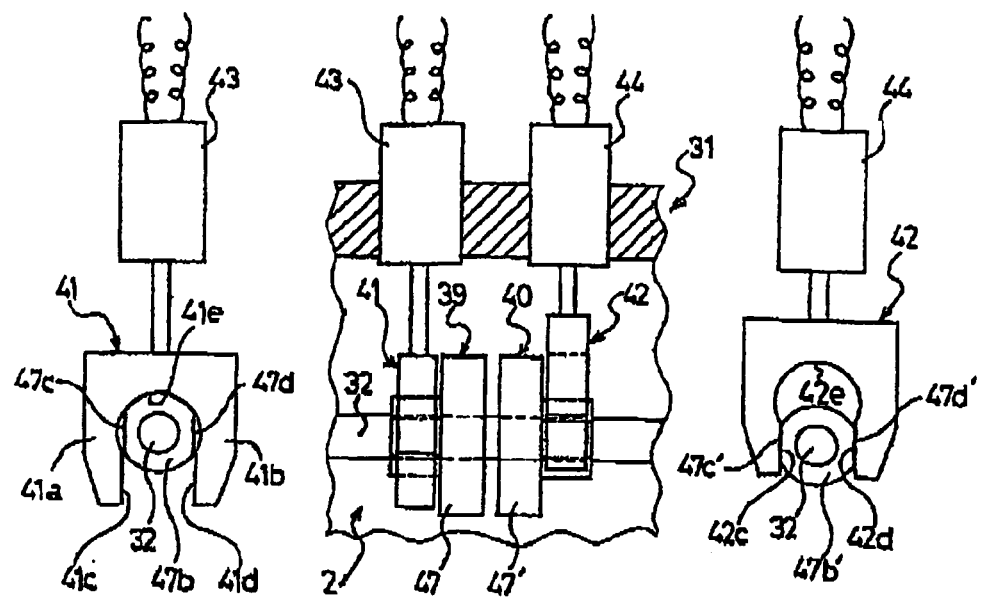
FIG. 11 is a diagram of a third EA operation pattern.
Figure 12:
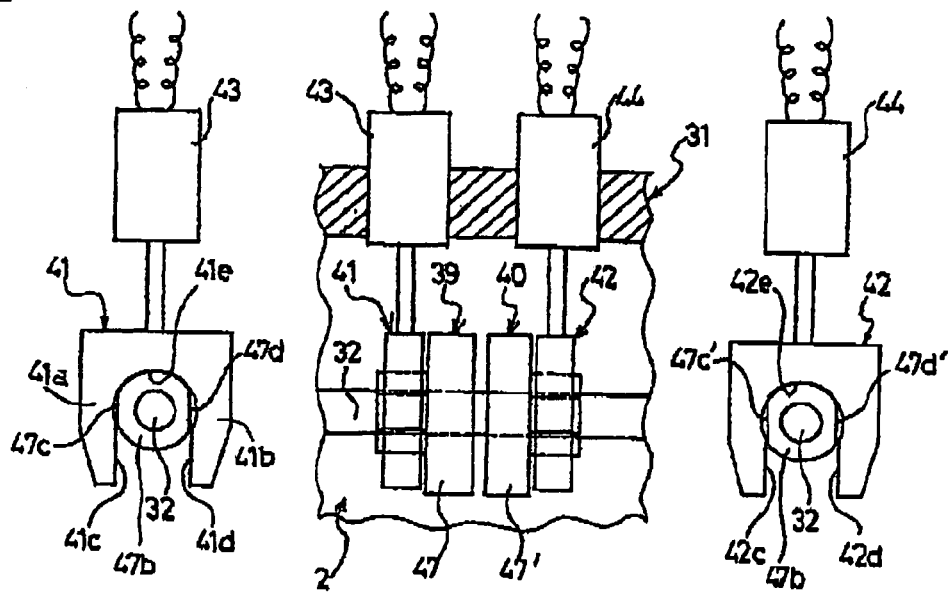
FIG. 12 is a diagram of a fourth EA operation pattern.

As shown in FIGS. 4(a) and 4(b), in the first EA mechanism 39 and the first operation control member 41, for example, when the rotation stop portions 41c and 41d of the first and second arms 41a and 41b are in positions opposed to the flat surfaces 47c and 47d of the cylinder 47b (in the position where the rotation stop portions 41c and 41d clamp the flat surfaces 47c and 47d), or when the first operation control member 41 is in an inoperative state, the rotation of the energy-absorbing-member support member 47 is stopped by the rotation stop portions 41c and 41d in contact with the flat surfaces 47c and 47d of the cylinder 47b. On the other hand, as shown in FIGS. 11 and 12, to be described later, when the rotation allowable portion 41e of the first and second arms 41a and 41b is at the cylinder 47b, or when the first operation control member 41 is in operation, the rotation of the energy-absorbing-member support member 47 is allowed by the rotation allowable portion 41e.

In this way, the rotation stop portions 41c and 41d of the first arms 41a and 41b, the rotation stop portions 42a and 42b of the second arms 42a and 42b, the rotation allowable portions 41e and 42e, the flat surfaces 47c and 47d of the cylinder 47b and the flat surfaces 47c' and 47d' of the cylinder 47b', and the first and second drive members 43 and 44 construct the brake system that controls the rotation of the energy-absorbing-member support members 47 and 47'.

As the rotation shaft 32 rotates clockwise, in FIG. 4(c), with the rotation of the energy-absorbing-member support member 47 stopped by the rotation stop portions 41c and 41d, as shown in FIGS. 4(a) to 4(c), also the energy-absorbing-member support ring 46 rotates clockwise. Then the first support portion 45a of the energy absorbing member 45 also rotates clockwise and so the U-shaped portion 45c moves continuously clockwise toward the second support portion 45b at the terminal. In short, the energy absorbing member 45 is continuously deformed. The deformation of the energy absorbing member 45 absorbs the impact energy to allow the EA operation of the energy absorbing member 45. The EA operation of the energy absorbing member 45 limits the load applied to the seatbelt 3. Finally, as shown in FIG. 4(d), the U-shaped portion 45c disappears and the second support portion 45b is separated from the cylindrical part of the closed-end cylinder 47a and as such, the EA operation of the energy absorbing member 45 is completed. Since the belt-like flat-plate energy absorbing member 45 is continuously deformed, the EA operation does not depend on friction, so that a stable FL load can be obtained.

Figure 8:
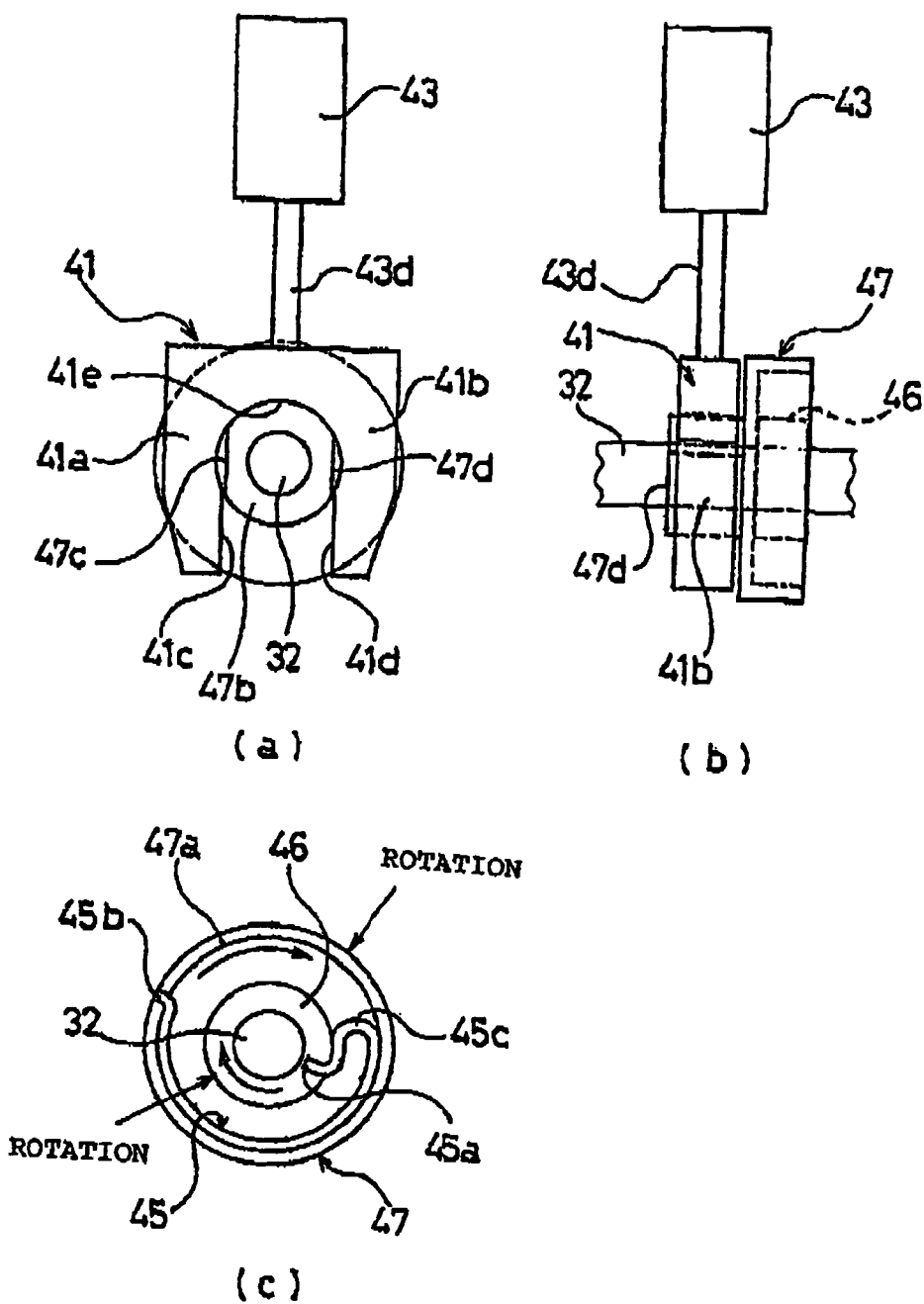

As the rotation shaft 32 rotates clockwise, in FIG. 8(c), with the rotation of the energy-absorbing-member support member 47 allowed by the rotation allowable portion 41e, as shown in FIGS. 8(a) to 8(c), also the energy-absorbing-member support ring 46 rotates clockwise. At that time, since the rotation of the energy-absorbing-member support member 47 is allowed, also the energy-absorbing-member support member 47 rotates clockwise therewith via the energy absorbing member 45. Accordingly, the energy absorbing member 45 is not deformed to maintain the initial state, performing no EA operation, which absorbs no impact energy. Since the EA operation of the energy absorbing member 45 is not performed, the load applied to the seatbelt 3 is not limited by the energy absorbing member 45.

Also the second EA mechanism 40 and the second operation control member 42 operate as in the first EA mechanism 39 and the first operation control member 41, respectively.

The first and second drive members 43 and 44 have the same structure, which will be described with reference to FIG. 7. As shown in FIG. 7, the first and second drive members 43 and 44 include gas generators 43b and 44b disposed in cylinders 43a and 44a, pistons 43c and 44c also disposed in the cylinders 43a and 44a, and piston rods 43d and 44d for connecting the pistons 43c and 44c and the first and second operation control members 41 and 42, respectively.

The pistons 43c and 44c are moved downward in FIG. 7 by the gas generated from the gas generators 43b and 44b and as such, the piston rods 43d and 44d extend from the cylinders 43a and 44a to move the first and second operation control members 41 and 42 downward.

In that case, the first and second operation control members 41 and 42 are pushed downward by relatively large force by the gas pressure of the gas generators 43b and 44b even if friction occurs between the rotation stop portions 41c and 41d and 42c and 42d and the flat surfaces 47c and 47d and 47c' and 47d'. This ensures switching the rotation from stop to allowance.

In the PFL 31 of this embodiment, four kinds of EA operation patterns are set by the operation or non-operation of the first and second EA mechanisms 39 and 40.

A first EA operation pattern is a pattern in which both of the brake systems of the first and second EA mechanisms 39 and 40 stop the rotation of the energy-absorbing-member support members 47 and 47', wherein both of the first and second EA mechanisms 39 and 40 perform EA operation.

Figure 9:
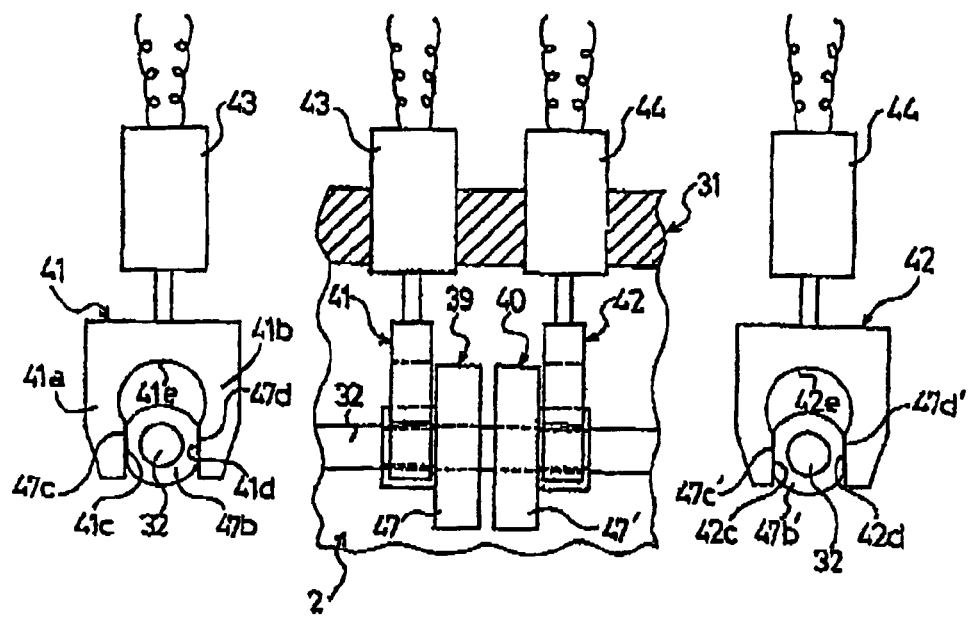
FIG. 9 is a diagram of a first EA operation pattern.

Specifically, in the first EA operation pattern, the rotation stop portions 41c and 41d and 42c and 42d of the first and second arms 41a and 41b and 42a and 42b are set in positions opposed to the flat surfaces 47c and 47d and 47c' and 47d' of the cylinders 47b and 47b', respectively, as shown in FIG. 9, to stop the rotation of the energy-absorbing-member support members 47 and 47' by the first and second operation control members 41 and 42, respectively. The FL load in the first EA operation pattern amounts to a total of the FL load F2 of the torsion bar 7, the FL load F5 of the first EA mechanism 39, and the FL load F6 of the second EA mechanism 40, as shown in FIG. 14(a). The first EA operation pattern is set for normal times, e.g., mainly for occupants with a weight heavier than average, although depending on the crash speed.

Figure 10:
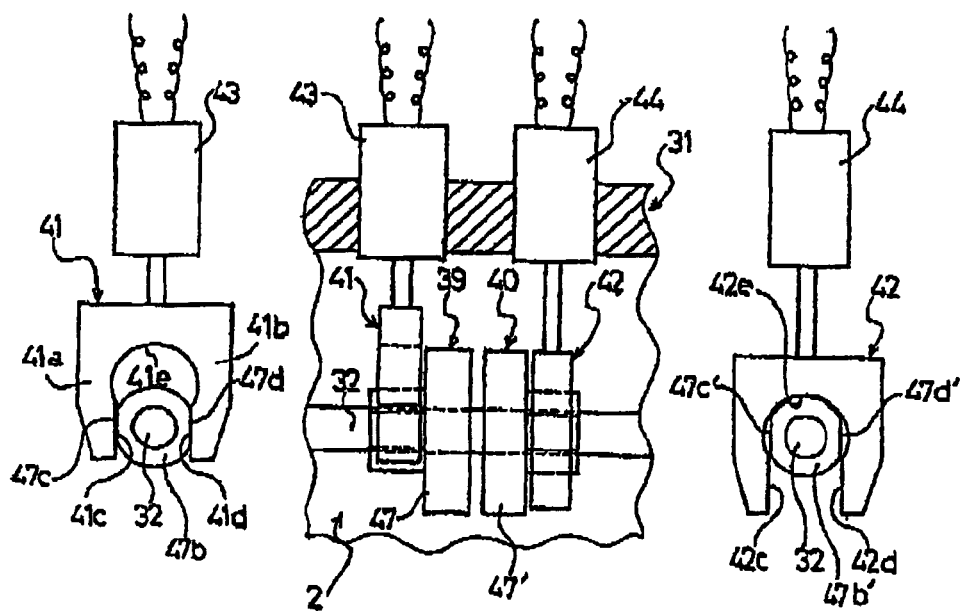
FIG. 10 is a diagram of a second EA operation pattern.

A second EA operation pattern is a pattern in which the brake system of the first EA mechanism 39 stops the rotation of the energy-absorbing-member support member 47 and the brake system of the second EA mechanism 40 allows the rotation of the energy-absorbing-member support member 47', in which the first EA mechanism 39 performs EA operation, while the second EA mechanism 40 performs no EA operation. Specifically, in the second EA operation pattern, the rotation stop portions 41c and 41d of the first arms 41a and 41b are set in positions opposed to the flat surfaces 47c and 47d of the cylinder 47b, respectively, while the rotation allowable portion 42e of the second operation control member 42 is set in a position opposed to the cylinder 47b', as shown in FIG. 10, to stop only the rotation of the energy-absorbing-member support member 47 by the first operation control member 41, and to allow the rotation of the energy-absorbing-member support member 47'. The FL load in the second EA operation pattern amounts to a total of the FL load F2 of the torsion bar 7 and the FL load F5 of the first EA mechanism 39, as shown in FIG. 14(b). The second EA operation pattern is set, e.g., for occupants of an average weight, although depending on the crash speed.

A third EA operation pattern is a pattern in which the brake system of the first EA mechanism 39 allows the rotation of the energy-absorbing-member support member 47 and the brake system of the second EA mechanism 40 stops the rotation of the energy-absorbing-member support member 47', in which the first EA mechanism 39 performs no EA operation and the second EA mechanism 40 performs EA operation. Specifically, in the third EA operation pattern, the rotation stop portions 42c and 42d of the second arms 42a and 42b are set in positions opposed to the flat surfaces 47c' and 47d' of the cylinder 47b', respectively, while the rotation allowable portion 41e of the first operation control member 41 is set in a position opposed to the cylinder 47b, as shown in FIG. 11, to stop only the rotation of the energy-absorbing-member support member 47' by the second operation control member 42, and to allow the rotation of the energy-absorbing-member support member 47. The FL load in the third EA operation pattern amounts to a total of the FL load $F_2$ of the torsion bar 7 and the FL load $F_6$ of the second EA mechanism 40, as shown in FIG. 14(c). The third EA operation pattern is set, e.g., for occupants with a weight lighter than average weight, although depending on the crash speed.

A fourth EA operation pattern is a pattern in which both of the brake systems of the first and second EA mechanisms 39 and 40 allow the rotation of the energy-absorbing-member support members 47 and 47', in which the first and second EA mechanisms 39 and 40 perform no EA operation. Specifically, in the fourth EA operation pattern, the rotation allowable portions 41e and 42e of the first and second operation control members 41 and 42 are set in positions opposed to the cylinders 47b and 47b' to allow the rotation of the energy-absorbing-member support members 47 and 47', respectively, as shown in FIG. 12. The FL load in the fourth EA operation pattern amounts to only the FL load F2 of the torsion bar 7, which is not shown. The fourth EA operation pattern is set, e.g., for occupants with a relatively light weight and low crash speed, as in the third EA operation pattern.

Since the four EA operation patterns can be set in this way, the limit load of the seatbelt 3 in a crash can be set effectively and easily depending on the situation of the emergency and the occupant's physique.

Figure 13:
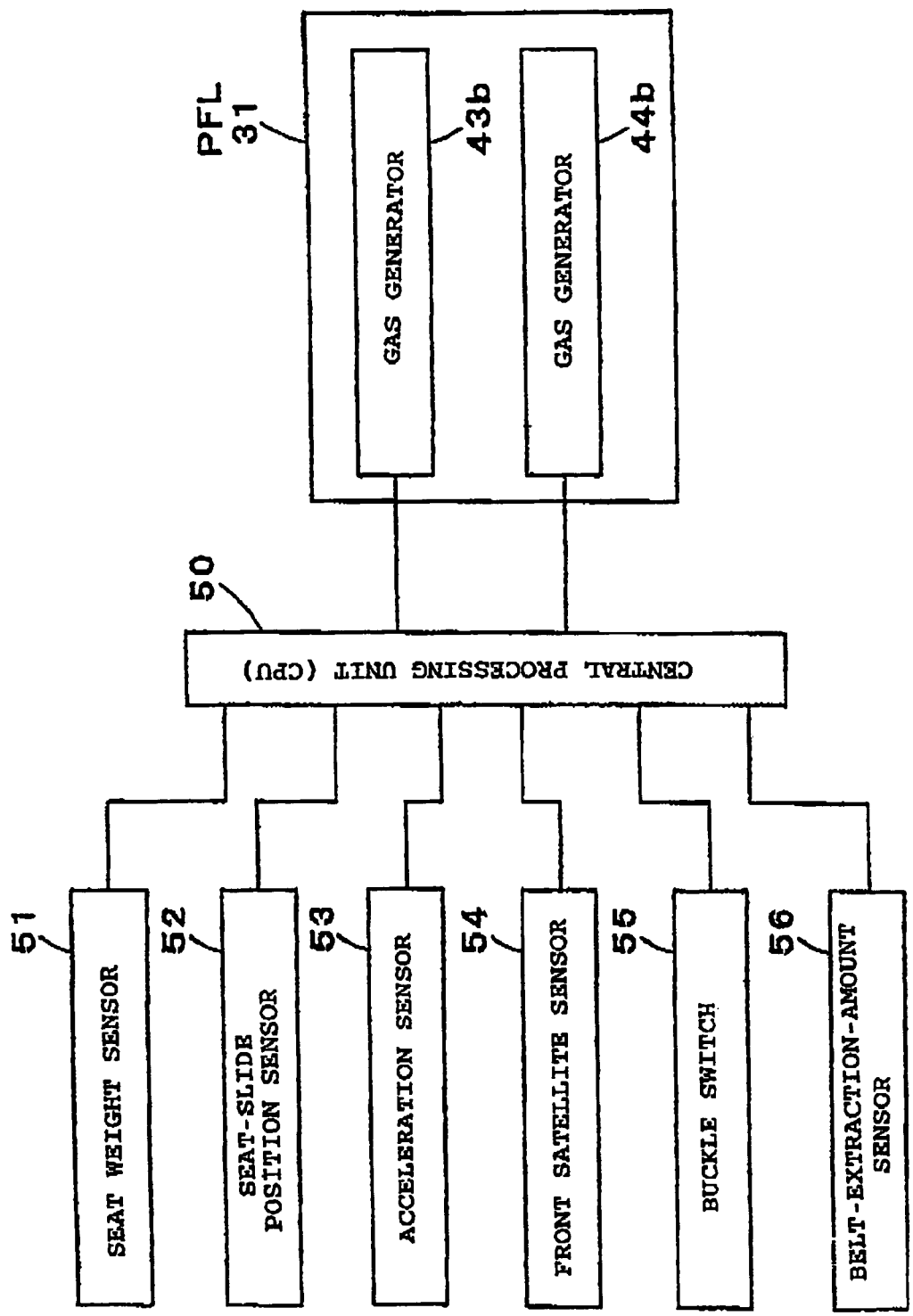
FIG. 13 is a block diagram of the control of the PFL according to the embodiment of FIG. 1.

As shown in FIG. 13, a central processing unit (hereinafter, referred to as a CPU, corresponding to the limit-load control means of the invention) 50 for controlling the operation of the gas generators 43b and 44b is provided to set the PFL 31 to the first to fourth EA operation patterns depending on the situation of emergency. The CPU 50 stores conditions for operating the PFL 31 in advance. The CPU 50 sets the condition of operating the PFL 31 according to the information that is known before a crash (e.g., information on occupant's weight and seat slide position), thereby changing the FL load at a crash.

For this purpose, the CPU 50 connects to a seat weight sensor 51 for measuring the load on a vehicle seat, or an occupant's weight, a seat-slide position sensor 52 for detecting the slide position of the vehicle seat, an acceleration sensor 53 for measuring the acceleration and deceleration of a vehicle, a front satellite sensor 54 for sensing the situation of the left and right crash at the front of the vehicle, a buckle switch 55 which is turned on when a tongue is retained in a buckle, and a belt-extraction-amount sensor 56 for measuring the extraction amount of the seatbelt 3 of the retractor 1.

The CPU 50 controls the operation of the PFL 31 depending on the situation of emergency by controlling the on (operation) and off (non-operation) of the gas generators 43b and 44b according to advance information by the signals from the seat weight sensor 51 and the seat-slide position sensor 52, and the signals from the acceleration sensor 53, the front satellite sensor 54, the buckle switch 55, and the belt-extraction-amount sensor 56 under the operating condition for the PFL 31.

The operating conditions for the PFL 31 will be specifically described.

With the seatbelt retractor 1 of this embodiment, the permission or prohibition of the operation of the PFL 31 is determined by the on/off of the buckle switch 55. Specifically, the CPU 50 sets the PFL 31 according to the on/off signal from the buckle switch 55 to allow the operation when the tongue is brought into engagement with the buckle and to prohibit the operation when the tongue is not in engagement with the buckle.

Furthermore, with the seatbelt retractor 1, the operation of the PFL 31 is varied depending on the severity of the crash. Specifically, the CPU 50 determines whether the occupant is small or large (including medium) according to the detection signal from the seat weight sensor 51, the seat-slide position sensor 52, or the belt-extraction-amount sensor 56 and also determines whether the crash is of a low speed (e.g., approximately 20 to 30 km/h, not limited to that) or of a middle or high speed (e.g., approximately 30 km/h or more, not limited to that) according to the detection signal from the acceleration sensor 53.

In consideration of the crash speed, for a rather lightweight occupant such as a child, the CPU 50 sets the PFL 31 in the fourth EA operation pattern for a low-speed crash and set the PFL 31 in the third EA operation pattern for a middle- or high-speed crash. For a relatively small-sized occupant larger than a child, the CPU 50 sets the PFL 31 in the third EA operation pattern for a low-speed crash and sets the PFL 31 in the second EA operation pattern for a middle- or high-speed crash. For an average-weight occupant, the CPU 50 sets the PFL 31 in the second EA operation pattern for a low-speed crash and sets the PFL 31 in the first EA operation pattern for a middle- or high-speed crash. For an occupant larger than an average occupant, the CPU 50 sets the PFL 31 in the first EA operation pattern for both of the low-speed crash and middle- or high-speed crash.

With the seatbelt retractor 1 of this embodiment, the operation timing of the PFL 31 is varied depending on the severity of the crash. Specifically, the CPU 50 determines whether the crash is at a low speed (e.g., approximately 20 to 30 km/h, not limited to that), at a middle speed (e.g., 30 to 40 km/h, not limited to that), or at a high-speed (e.g., 40 km/h or more, not limited to that) according to the detection signal from the acceleration sensor 53. For a low-speed crash, the CPU 50 delays the start of the operation of the PFL 31 (e.g., 35 ms after the crash, not limited to that); for a middle-speed crash, relatively delays the start of the operation of the PFL 31 (earlier than the low-speed crash, e.g., 25 ms after the crash, not limited to that); and for a high-speed crash, speeds up the start of the operation of the PFL 31 (e.g., 15 ms after the crash, not limited to that).

After the crash, the operation start timing for the PFL 31 can be varied depending on the vehicle crash severity. Also the operation start timing of the PFL 31 can be varied by the fixed delay time after the ignition of the pretensioner 11 with the operation timing of the pretensioner 11.

The seatbelt retractor 1 varies the operation of the PFL 31 depending on the crash severity and crash situation. Specifically, the CPU 50 determines whether the crash is a right-side offset crash or a left-side offset crash according to the detection signals from the acceleration sensor 53 and the front satellite sensor 54. For a right-side offset crash (a crash offset to the right of the vehicle), the CPU 50 accelerates the start of operation of the PFL 31 in the retractor of a right-hand seatbelt system mounted to the right-hand seat and delays the start of operation of the PFL 31 in the retractor of a left-hand seatbelt system mounted to the left-hand seat. Conversely, for a left-side offset crash (a crash offset to the left of the vehicle), the CPU 50 accelerates the start of operation of the PFL 31 in the retractor of a left-hand seatbelt system mounted to the left-hand seat and delays the start of operation of the PFL 31 in the retractor of a right-hand seatbelt system mounted to the right-hand seat.

The CPU 50 determines whether the crash is a right-side oblique crash or a left-side oblique crash according to the detection signals from the acceleration sensor 53 and the front satellite sensor 54, as in the above. For a right-side oblique crash, the CPU 50 accelerates the start of operation of the right-hand PFL 31 and delays the start of operation of the left-hand PFL 31. Conversely, for a left-side oblique crash, the CPU 50 accelerates the start of operation of the left-hand PFL 31 and delays the start of operation of the right-hand PFL 31.

Thus the PFL 31 and the CPU 50 constitute a second seatbelt load limit mechanism of the invention.

The operation of the seatbelt retractor 1 with this structure will now be described.

In normal conditions in which high deceleration such as a crash is not applied to the vehicle, the CPU 50 does not activate the gas generators 43*b* and 44*b* and sets the PFL 31 in the first EA operation pattern shown in FIG. 9. Since the gas generators 43*b* and 44*b* are not activated, both of the first and second operation control members 41 and 42 are not moved, being held in inoperative positions. Accordingly, the rotation stop portions 41*c* and 41*d* and 42*c* and 42*d* of the first and second arms 41*a* and 41*b* and 42*a* and 42*b* are set in positions opposed to the flat surfaces 47*c* and 47*d* and 47*c*' and 47*d*' of the energy-absorbing-member supports member 47 and 47', respectively. The energy-absorbing-member supports member 47 and 47' are thus braked by the first and second arms 41*a* and 41*b* and 42*a* and 42*b* to stop the rotation thereof.

Also, since the deceleration detection means 5 senses no high deceleration, the locking mechanism 6 is not activated, so that the pawl 13 of the locking mechanism 6 is not rotated. Therefore, the clutch pawl 37 is not rotated and as such, the clutch mechanism 36 is set to a state in which the spool 4 and the spool-side gear 34 are not rotatably connected. Accordingly, even when the spool 4 is rotated when the seatbelt 3 is extracted or retracted, the rotation of the spool 4 is not transmitted to the rotation shaft 32, and so the rotation shaft 32 is not rotated. Thus, the seatbelt 3 can be extracted freely and smoothly like the general related-art seatbelt retractor and can be retracted by the spring means 8. The occupant can therefore fasten or release the seatbelt 3 easily.

In an emergency such as a car crash, the deceleration detection means 5 detects high deceleration and activates the locking mechanism 6. Then the pawl 13 of the locking mechanism 6 is rotated into engagement with the internal gear 19 of the side wall 2*b* of the frame 2 and as such, the rotation of the locking base 14 in the seatbelt extracting direction is stopped. At that time, the clutch pawl 37 is also rotated with the rotation of the pawl 13, and the engage claws 37*a* are brought into engagement with the internal gear 34*b* of the spool-side gear 34. Briefly, the clutch mechanism 36 is activated to rotatably connect the spool 4 with the spool-side gear 34 in the seatbelt extracting direction. At that time, as the spool 4 rotates further in the seatbelt extracting direction by the inertial force of the occupant, a high shearing force is applied to the shear pin 38, so that the shear pin 38 is sheared. Then the spool 4 and the spool-side gear 34 are rotated in the seatbelt extracting direction. The rotation of the spool 4 is transmitted to the rotation shaft 32 via the spool-side gear 34 and the PFL-side gear 35 and as such, the rotation shaft 32 is rotated in the opposite direction.

At the same time, the CPU 50 sets one of the first to fourth EA operation patterns depending on the situation of the emergency and controls the operation of the gas generators 43*b* and 44*b* corresponding to the set EA operation pattern. When at least one of the first and second drive members 43 and 44 is activated, one of the first and second operation control members 41 and 42 which corresponds to the activated gas generator moves downward and so the rotation allowable portions of the first and second arms of the moved operation control member is brought to the cylinder of the energy-absorbing-member support member. Then the brake applied to the energy-absorbing-member support member is released to allow the rotation of the energy-absorbing-member support member.

Accordingly, when the rotation shaft 32 rotates, of the first and second operation control members 41 and 42, the energy-absorbing-member support member of which the brake has been released is rotated via the energy-absorbing-member support ring 46 and the energy absorbing member 45. Thus, the EA operation by one of the first and second EA mechanisms 39 and 40 corresponding to the activated gas generator is not performed but the EA operation by the EA mechanism corresponding to the inoperative gas generator and the torsion bar 7 is performed.

Figure 22:
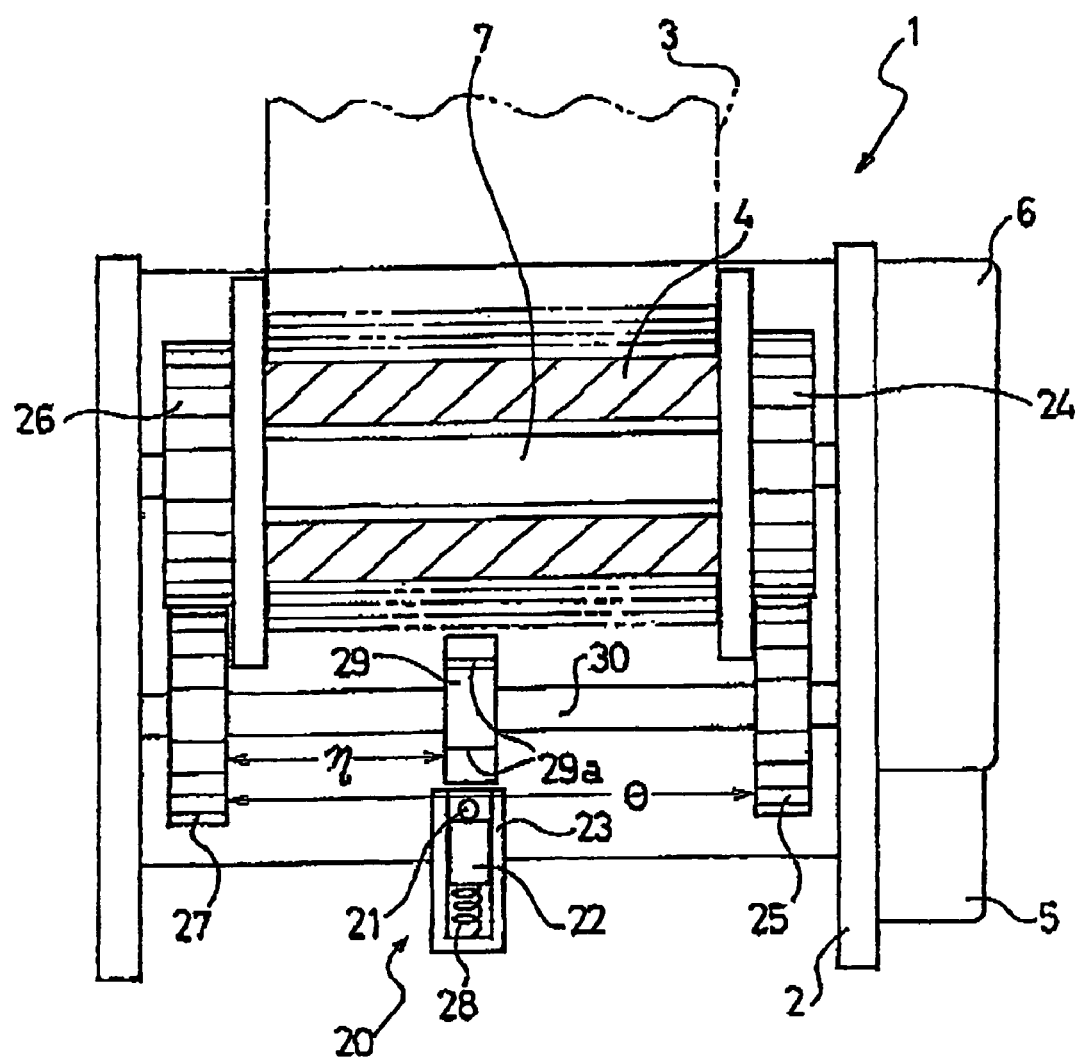
FIG. 22 is a schematic diagram of another seatbelt retractor including a torsion bar.
Figure 23:
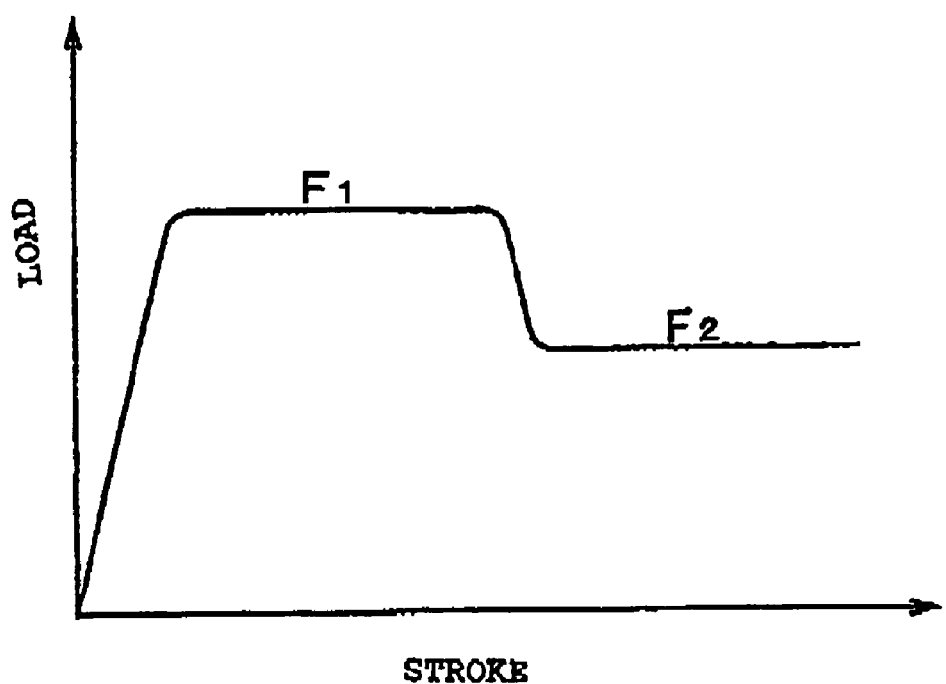
FIG. 23 is a graph showing the characteristic of the FL load of the seatbelt retractor of FIG. 22.

With the brake system of this embodiment, the rotation of the energy-absorbing-member support members 47 and 47', which are rotation members, is stopped by the structure in which the flat surfaces 47c and 47d of the cylinder 47b of the energy-absorbing-member support member 47 is clamped between the planer rotation stop portions 41c and 41d of the first and second arms 41a and 41b of the first operation control member 41, and the flat surfaces 47c' and 47d' of the cylinder 47b' of the energy-absorbing-member support member 47' is clamped between the planer rotation stop portions 42c and 42d of the first and second arms 42a and 42b of the second operation control member 42; also, the rotation of the energy-absorbing-member support members is allowed by the structure in which the arc-shaped rotation allowable portion 41e of the first and second arms 41a and 41b of the first operation control member 41 is provided at the cylinder 47b, and the arc-shaped rotation allowable portion 41e' of the first and second arms 42a and 42b of the second operation control member 42 is provided at the cylinder 47b'. Accordingly, the force applied to the rotation stop portions 41c and 41d of the first and second arms 41a and 41b and the rotation stop portions 42c and 42d of the first and second arms 42a and 42b are smaller than that of the related-art seatbelt retractor shown in FIG. 22. Thus, the strength of the first and second arms 41a and 41b and 42a and 42b can be made smaller and so a compact brake system can be achieved.

Moreover, since the rotation of the energy-absorbing-member support members 47 and 47' is stopped by the first and second arms 41a and 41b and 42a and 42b in a state in which the rotation of the energy-absorbing-member support members 47 and 47' is stopped, no large impactive force is applied to the first and second arms 41a and 41b and 42a and 42b from the energy-absorbing-member support members 47 and 47'. This can also decrease the strength and size of the first and second arms 41a and 41b and 42a and 42b.

With the seatbelt retractor 1 according to the embodiment, the limit load of the seatbelt 3 in a crash can be varied more flexibly depending on the situation of the crash and the occupant's physique by controlling the operation of the EA mechanisms 39 and 40 according to advance information (occupant's weight information, seat-slide position information) and information on emergency situation such as crash severity (crash speed, crash situation, etc.) with the simple structure of the two first and second EA mechanisms 39 and 40. Thus the occupant can be protected more effectively and appropriately in a crash.

Particularly, since the first and second operation control members 41 and 42 are operated by a relatively large force by the gas pressure of the gas generators 43b and 44b, the operation of the first and second operation control members 41 and 42 can be switched reliably.

The other structures and operations of the seatbelt retractor 1 of this embodiment are the same as those of the related art and the foregoing embodiment of the invention.

Figure 15:
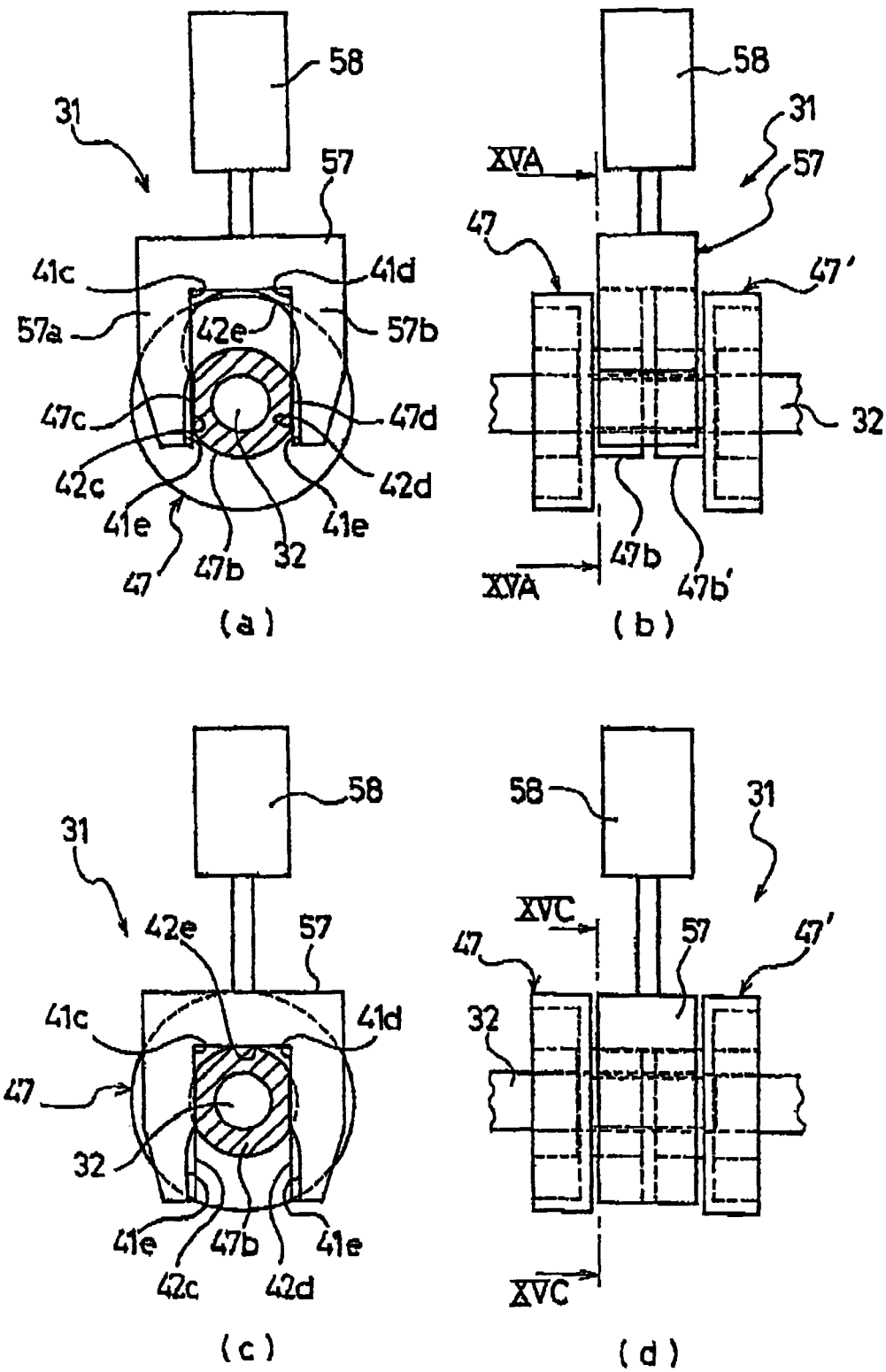

FIG. 15 is a schematic diagram of a brake system according to another embodiment of the invention, wherein FIG. 15(a) is a cross sectional view taken along line XVA-XVA of FIG. 15(b), with the gas generator in an inoperative state, FIG. 15(b) is a front view of the brake system with the gas generator in an inoperative state, FIG. 15(c) is a cross-sectional view taken along line XVC-XVC of FIG. 15(d), with the gas generator in an operative state, and FIG. 15(d) is a front view of the brake system with the gas generator in an operative state.

As shown in FIGS. 15(a) and 15(b), in the PFL 31 of this embodiment, the two EA mechanisms 39 and 40 are disposed on the rotation shaft 32 in opposite positions to that of FIG. 1. A common operation control member 57 is provided to control the EA operation of the first and second EA mechanisms 39 and 40. Thus, the operation control member of this embodiment is decreased by one as compared with that of FIG. 1.

Figure 16:
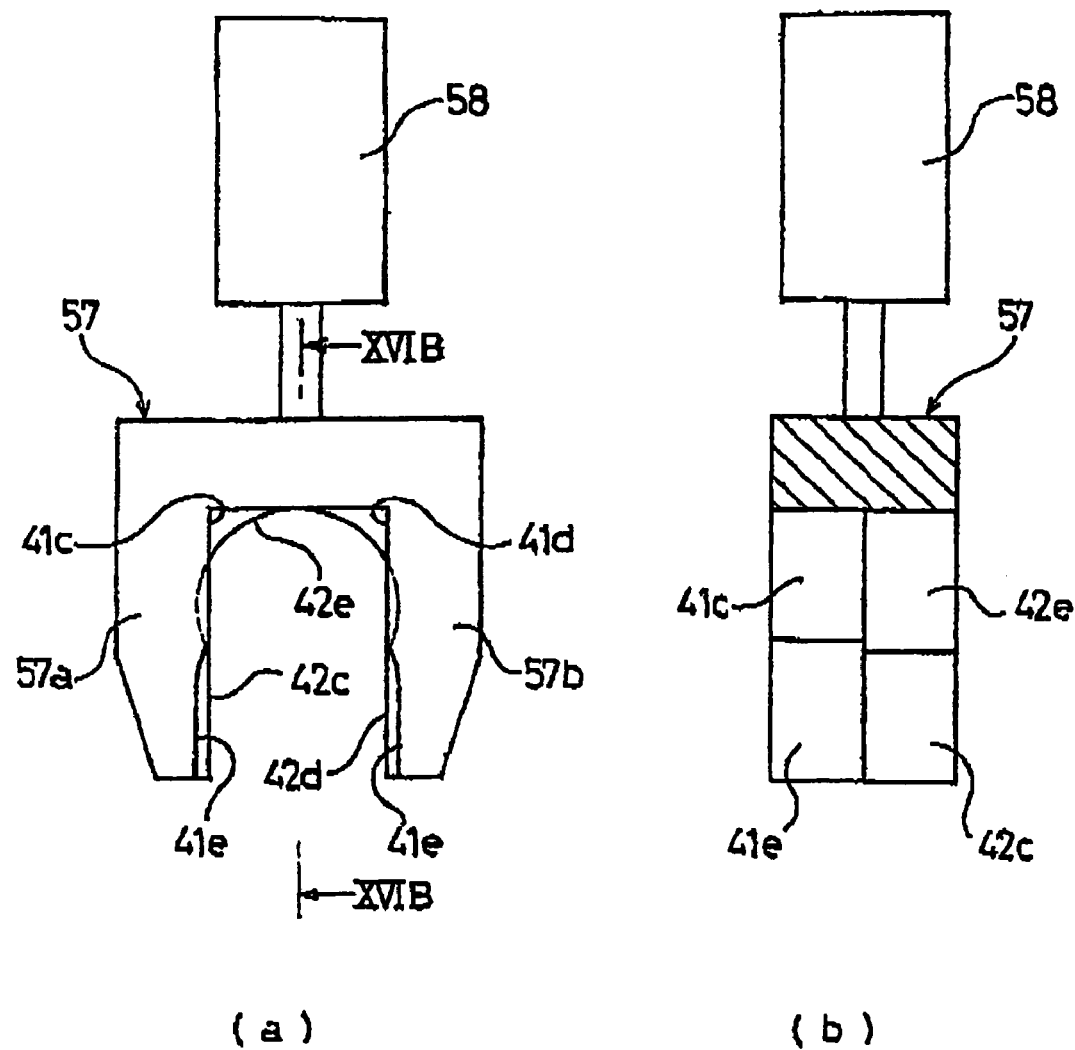

As shown in FIGS. 16(a) and 16(b), the operation control member 57 has the rotation stop portions 41c and 41d and the rotation allowable portion 41e corresponding to the cylinder 47b of the energy-absorbing-member support member 47 at one end of the first and second arms 57a and 57b, and has the rotation stop portions 42c and 42d and the rotation allowable portion 42e corresponding to the cylinder 47b' of the energy-absorbing-member support member 47' at the other end of the first and second arms 57a and 57b. In that case, the rotation stop portions 42c and 42d and the rotation allowable portion 42e are disposed in the vertically same positions as in the foregoing embodiment, while the rotation stop portions 41c and 41d and the rotation allowable portion 41e are disposed in the vertically opposite positions from the foregoing embodiment.

In other words, when the rotation of the energy-absorbing-member support member 47 is allowed by the rotation allowable portion 41e, the rotation of the other energy-absorbing-member support member 47' is stopped by the rotation stop portions 42c and 42d, as shown in FIGS. 15(a) and 15(b). When the rotation of the energy-absorbing-member support member 47 is stopped by the rotation stop portions 41c and 41d, the rotation of the other energy-absorbing-member support member 47' is allowed by the rotation allowable portion 42e, as shown in FIGS. 15(c) and 15(d).

Since only one operation control member 57 is provided, also the drive member is provided as a common drive member 58 for the first and second EA mechanisms 39 and 40. Accordingly, in this embodiment, also the number of the drive members is one fewer than that shown in FIG. 1. The structure of the drive member 58 is the same as that of the first and second drive members 43 and 44 shown in FIG. 7, which has a gas generator, a piston, and a piston rod.

The PFL 31 of this embodiment has two EA operation patterns similar to the second and third EA operation patterns according to the foregoing embodiment. More specifically, when the gas generator is not activated, only the rotation of the energy-absorbing-member support member 47', shown in FIGS. 15(a) and 15(b), is set to be stoppable. Accordingly, only the EA operation of the second EA mechanism 40 is allowed at that time, and the FL load at the time when only the second EA mechanism 40 performs the EA operation becomes the level shown in FIG. 14(c), as above. On the other hand, when the gas generator is activated, only the rotation of the energy-absorbing-member support member 47, shown in FIGS. 15(c) and 15(d), is set to be stoppable. Accordingly, only the EA operation of the first EA mechanism 39 is allowed. The FL load when only the first EA mechanism 39 performs the EA operation becomes the level shown in FIG. 14(b), as above.

Thus, in the PFL 31 of this embodiment, only two EA operation patterns can be set. However, the PFL 31 can be simple in structure and reduced in cost, as compared with the embodiment of FIG. 1, because only one operation control member 57 and one drive member 58 including the gas generator are provided.

Other advantages of the seatbelt retractor 1 of this embodiment are the same as those of the embodiment in FIG. 1.

Figure 18:
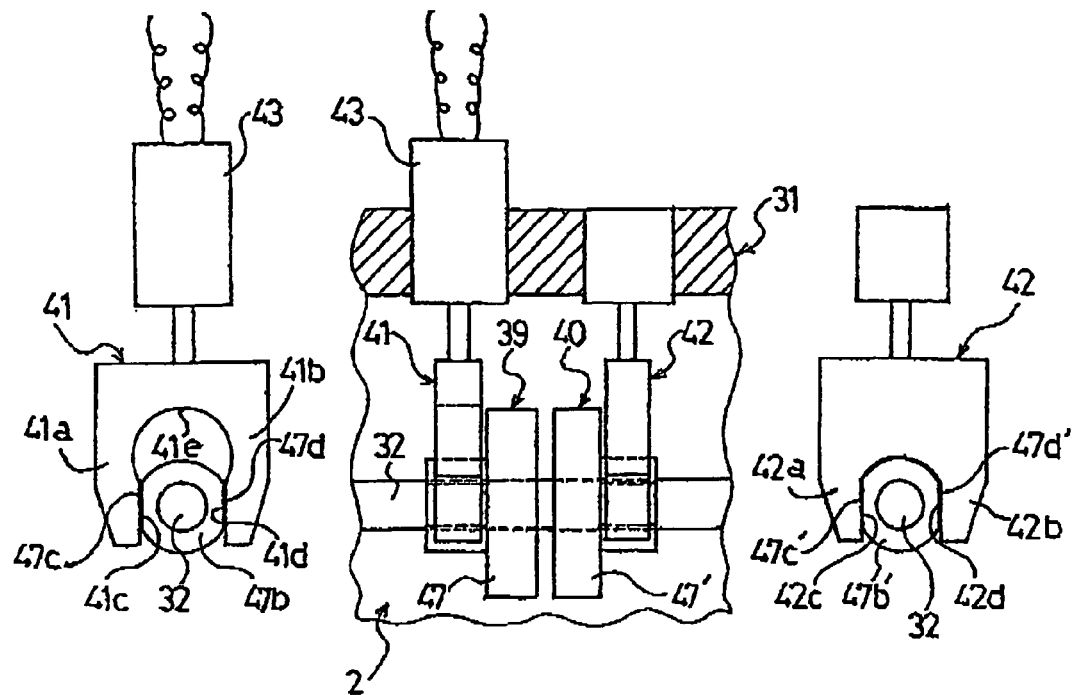
FIG. 18 is a schematic and partial diagram of a first EA mechanism of a seatbelt retractor including a brake system according to another embodiment of the invention, with the gas generator in an inoperative state.
Figure 19:
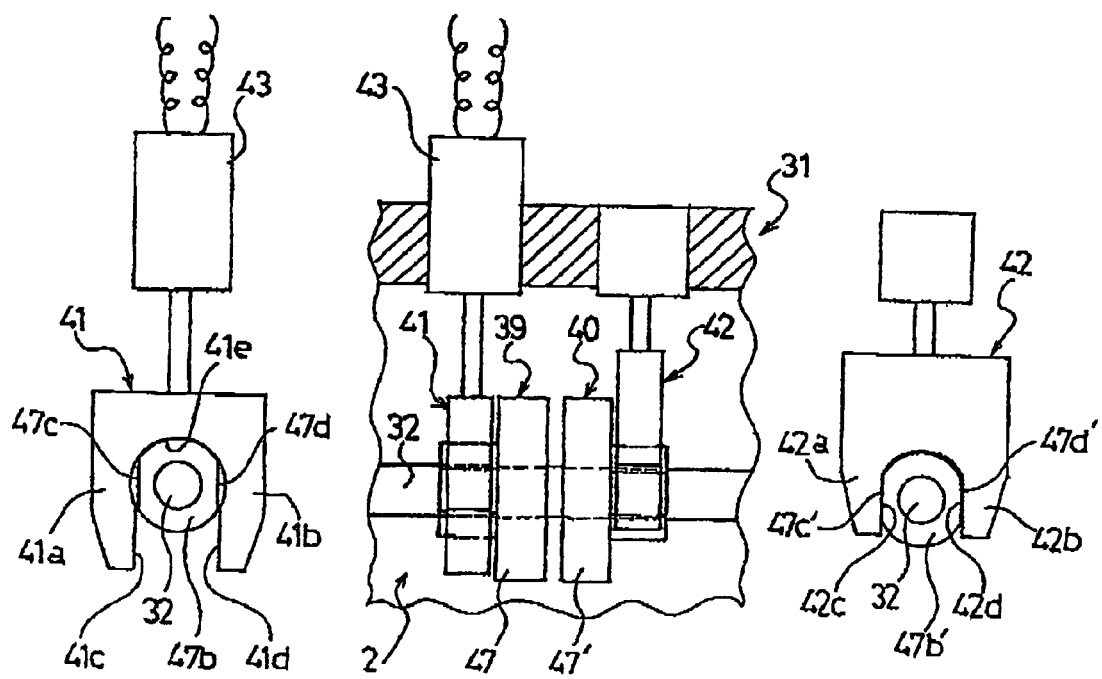
FIG. 19 is a schematic and partial diagram of the first EA mechanism of the seatbelt retractor of this embodiment shown in FIG. 18, with the gas generator in an operative state.

FIG. 18 is a schematic and partial diagram of a first EA mechanism of a seatbelt retractor including a brake system according to another embodiment of the invention, with the gas generator in an inoperative state. FIG. 19 is a schematic and partial diagram of the first EA mechanism of the seatbelt retractor of this embodiment, with the gas generator in an operative state.

With the seatbelt retractor 1 including the brake system of FIG. 1, the first and second EA mechanisms 39 and 40 are controlled by the corresponding first and second drive members 43 and 44 so as to performed the EA operation while the first and second drive members 43 and 44 are inoperative and not to perform the EA operation while the first and second drive members 43 and 44 are operative. However, as shown in FIGS. 18 and 19, the seatbelt retractor of this embodiment does not have the second drive member 44 of the first and second drive members 43 and 44, and the second control operation member 42 is fixed directly to the frame 2.

In that case, the second arms 42a and 42b of the second control operation member 42 have the rotation stop portions 42c and 42d but have not the arc-shaped rotation allowable portion 42e. The rotation stop portions 42c and 42d of the second arms 42a and 42b are always set in the positions opposed to the flat surfaces 47c' and 47d' of the cylinder 47b' of the energy-absorbing-member support member 47', whereby the rotation of the energy-absorbing-member support member 47' is always stopped by the second control operation member 42. Thus, the second EA mechanism 40 is preset in an operative state from the start and held in this operative state, so that the EA operation by the second EA mechanism 40 is performed all the time. Furthermore, the length of the belt-like flat-plate energy absorbing member 45 of the second EA mechanism 40 is preset in a specified value, and the stroke of the EA operation is fixed according to the specified value.

Figure 20:
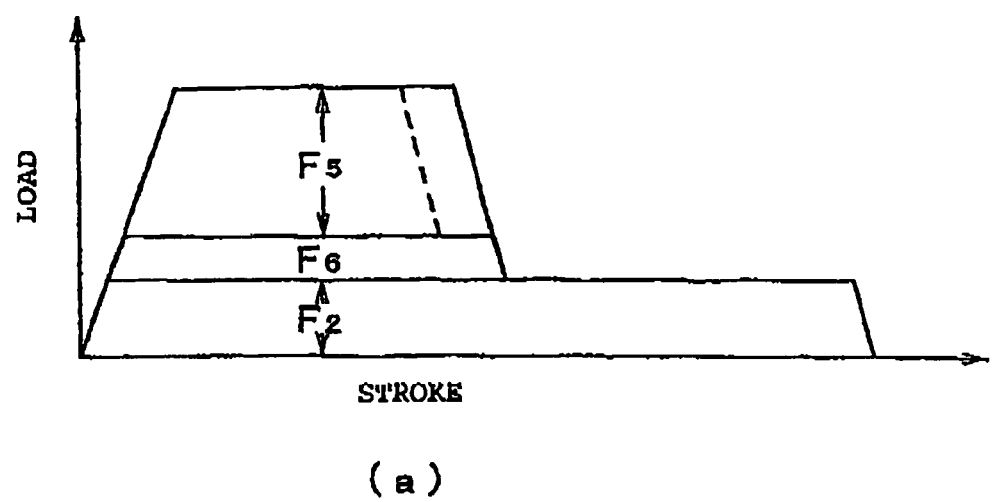
FIG. 20(a) shows the FL load of the first EA mechanism of FIG. 18, with the gas generator in an inoperative state.
FIG. 20(b) shows the FL load of the first EA mechanism, with the gas generator in an operative state.
Figure 20:
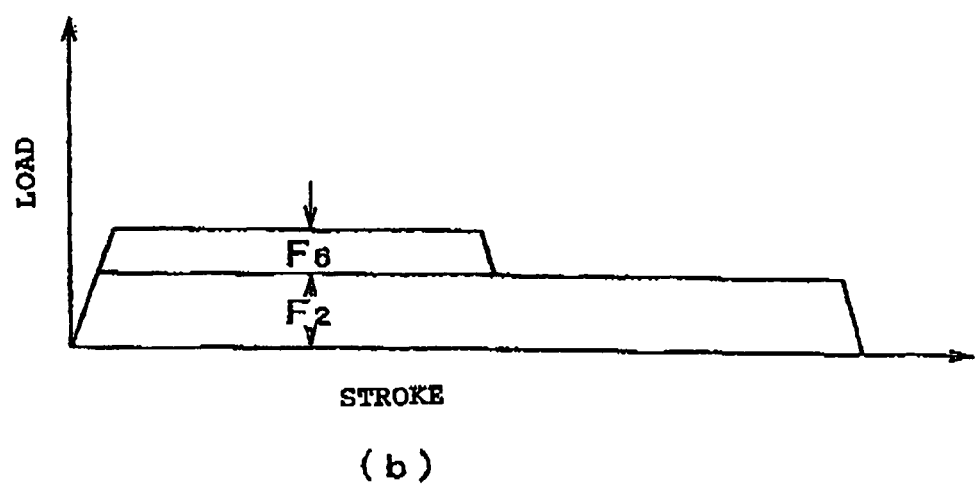

The first and second EA mechanisms 39 and 40 have two EA operation patterns. Specifically, as shown in FIG. 18, in a first operation pattern, the first drive member 43 is not activated, so that the rotation of the energy-absorbing-member support member 47 is stopped by the rotation stop portions 41c and 41d of the first operation control member 41, wherein the EA operation by the first EA mechanism 39 is performed and the EA operation by the second EA mechanism 40 is performed, as in the foregoing embodiments. The FL load in the first operation pattern amounts to a total of the FL load F2 of the torsion bar 7, the FL load F5 of the first EA mechanism 39, and the FL load F6 of the second EA mechanism 40, as shown in FIG. 20(a), which is substantially equal to the FL load of the embodiment of FIG. 1, shown in FIG. 14(a). Accordingly, the first operation pattern is set for normal times, e.g., mainly for occupants with a weight heavier than average, although depending on the crash speed, as in the foregoing embodiment.

As shown in FIG. 19, a second EA operation pattern is a pattern in which the first drive member 43 is activated to allow the rotation of the energy-absorbing-member support member 47 by the rotation allowable portion 41e of the first operation control member 41, wherein the EA operation by the first EA mechanism 39 is not performed but the EA operation by the second EA mechanism 40 is performed.

The FL load in the second EA operation pattern amounts to a total of the FL load F2 of the torsion bar 7 and the FL load F6 of the second EA mechanism 40, as shown in FIG. 20(b), which is substantially equal to the FL load of the embodiment of FIG. 1, shown in FIG. 14(c). The second EA operation pattern is set, e.g., mainly for occupants with a weight lighter than average weight, although depending on the crash speed, as in the foregoing embodiment.

The stroke of the EA operation by the first EA mechanism 39 can be adjusted to be short or long as indicated by the dotted line of FIG. 20(a) by controlling the time after the start of the EA operation by the first EA mechanism 39 to the activation of the first drive member 43 as appropriate. The adjustment of the stroke is allowed also in the foregoing embodiments by appropriately controlling the time until the first and second drive members 43 and 44 and the drive member 58 are activated.

Since the seatbelt retractor 1 of this embodiment has not the second drive member 44, the number of components can be decreased and so the structure can be simplified, so that the cost can be reduced.

The other structure and advantages of the brake system and the seatbelt retractor 1 of this embodiment are the same as those of FIG. 1.

Although in this embodiment the second drive member 44 is not provided, the first drive member 43 can be omitted instead, in which the first operation control member 41 is fixed directly to the frame 2. In this case, the FL load is substantially equal to the FL load shown in FIGS. 14(a) and 14(b).

Although, in the foregoing embodiments, the brake system of the invention is applied to the seatbelt retractor 1, the invention is not limited to that but can also be applied to another brake system that controls the operation of the rotation member.

Although, in the foregoing embodiments, the cylinder 47b, which is a rotation member, has a pair of flat surfaces 47c and 47d on the outer circumference, it may have one or more any number of flat surfaces.

In the foregoing embodiments, the cylinder 47 is used as the rotation member. However, the brake system of the invention can be applied also to a columnar rotation member that has at least one flat surface on the outer circumference. Furthermore, the brake system of the invention can also be applied to a polygonal-column or polygonal-cylinder cross-section rotation member such as a triangular cross-section or rectangular cross-section column or cylinder. In that case, the outer flat surface of the polygonal-column or polygonal-cylinder rotation member can be used as the flat surface of the rotation member of the invention.

Figure 17:
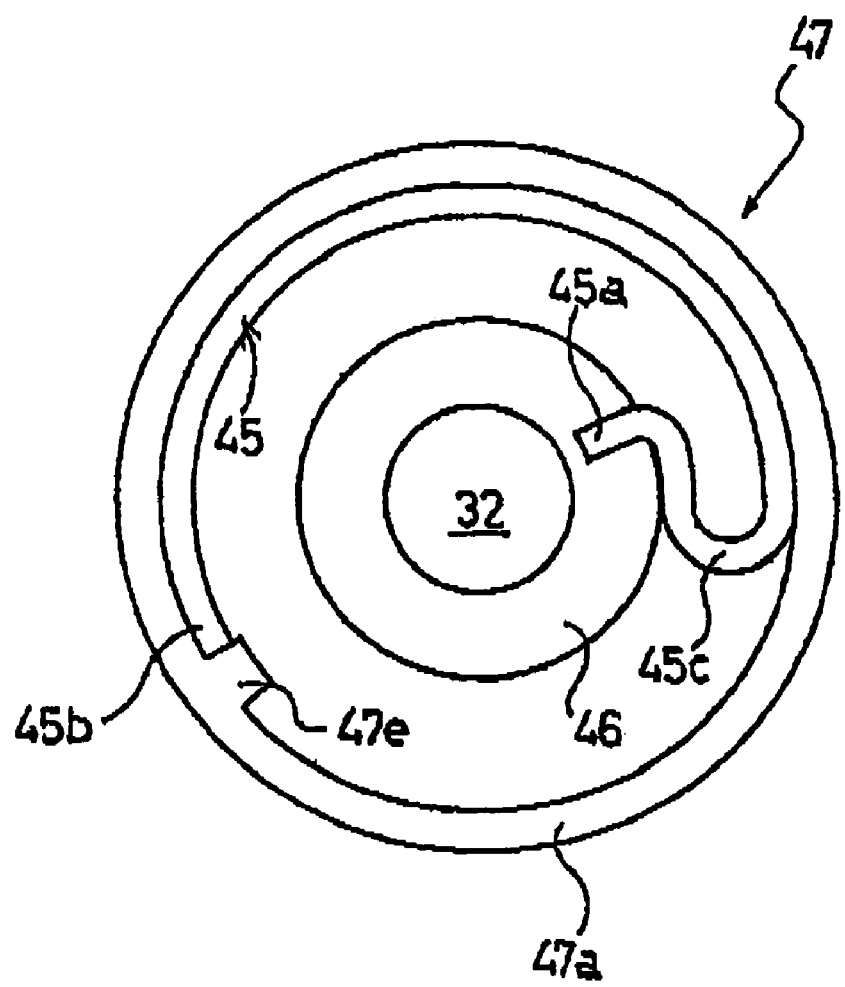
FIG. 17 is a diagram of an energy absorbing member and an energy-absorbing-member support member according to another embodiment.

Furthermore, in the foregoing embodiments, the second support portion 45b of the energy absorbing member 45 is bent and slidably passed through the cylindrical part of the closed-end cylinder 47a of the energy-absorbing-member support member 47. The invention, however, is not limited to that but may be constructed such that a projection 47e is provided on the inner circumference of the closed-end cylinder 47a, by which the end of the unbent second support portion 45b is supported, as shown in FIG. 17. It is needless to say that also the energy-absorbing-member support member 47' of the second EA mechanism 40 has a projection similar to the projection 47e of the first EA mechanism 39, on the inner circumference of the closed-end cylinder.

Although in the foregoing embodiments there are two each of the EA mechanisms, the operation control members, and the drive members, they may be one each or three or more each.

Furthermore, when the operation control member 57 is activated in advance, a low-cost solenoid can be used in place of the gas generator.

In the foregoing embodiments, the torsion bar 7 is used as the first seatbelt-load limit mechanism. In place of the torsion bar 7, the following EA mechanisms can be used: an EA mechanism disclosed in Japanese Unexamined Patent Application Publication No. 2002-53007 in which a wire rod provided on the locking base side is rubbed with an engage pin provided on the spool side, an EA mechanism disclosed in Japanese Unexamined Patent Application Publication No. 2000-85527 in which a belt-like plate one end of which is provided on the spool side is forced to be deformed by a guide groove provided on the locking base side, an EA mechanism disclosed in Japanese Unexamined Patent Application Publication No. 2002-53008 in which a cylinder provided on the spool side is elastically deformed by a retaining portion provided on the locking base side, an EA mechanism disclosed in Japanese Unexamined Patent Application Publication No. 10-258702 in which a U-shaped flat plate material one end of which is provided on the locking base side and the other end is in engagement with the spool side is deformed, an EA mechanism disclosed in Japanese Unexamined Patent Application Publication No. 2001-106025 in which a shear pin provided between the spool and the locking base is sheared when the rotation of the locking base is locked in an emergency, an EA mechanism disclosed in Japanese Unexamined Patent Application Publication No. 2001-106025 in which a portion provided on the spool side is cut with a cutting edge provided on the locking base side, and an EA mechanism in which a plate-like energy absorbing member on the locking-base side is cut by the cutting projection on the spool side (Japanese Patent Application No. 2003-206807). The EA mechanisms will be easily understood with reference to the publications, so that their description will be omitted here. The foregoing documents mentioned in this paragraph are incorporated by reference herein in their entirety.

The brake system of the invention is suitable for a brake system for controlling the rotation of a rotation member.

The seatbelt retractor and the seatbelt system of the invention are used for seatbelt systems mounted to vehicles such as cars and are suitable for seatbelt retractors and seatbelt systems that stop the extraction of seatbelts while absorbing impact energy applied to the occupants by limiting the load applied to the seatbelts in an emergency such as a crash.

The priority applications JP 2005-082104, filed Mar. 22, 2005; JP 2004-219934 filed Jul. 28, 2004; and JP 2004-316142, filed Oct. 29, 2004, are incorporated by reference herein.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seatbelt retractor, comprising:
a spool configured to retract a seatbelt,
a locking mechanism including a locking member configured to rotate normally with the spool by transmission of rotation of the spool via a rotation transmission shaft and stop the rotation in the seatbelt extracting direction in an emergency, and
first and second seatbelt-load limit mechanisms configured to limit the load applied to the seatbelt when the rotation of the locking member in the seatbelt extracting direction is stopped and the spool rotates relative to the locking member in the seatbelt extracting direction,
wherein the first seatbelt-load limit mechanism is a torsion bar disposed between the spool and the locking member, wherein the torsion bar is configured to be twisted into deformation, the rotation transmission shaft is formed by the torsion bar,
wherein the second seatbelt-load limit mechanism is provided on a second rotation shaft that is rotated by the rotation of the spool in an emergency, wherein the second rotation shaft is located parallel to the torsion bar seatbelt-load limit mechanism includes a limit-load setting device configured to set a limit load for the seatbelt and a limit-load control device configured to control the limit-load setting device so as to vary the limit load of the seatbelt in an emergency depending on the situation of the emergency,
wherein the limit-load setting device includes a first energy absorbing mechanism and a second energy absorbing mechanism,
wherein each of the first and second energy absorbing mechanisms includes a first energy-absorbing-member support member provided on the rotation shaft such that it can rotate therewith, a second energy-absorbing-member support member provided on the rotation shaft such that it can rotate relative thereto, an energy absorbing member disposed between the first and second energy-absorbing-member support members, wherein the energy absorbing member is configured to absorb energy during relative rotation between the first and second energy-absorbing-member support members, and a brake system that controls the rotation of the second energy-absorbing-member support member,
wherein the brake system includes at least one rotation member having at least one flat surface on the outer circumference, wherein the second energy-absorbing-member support member is the rotation member, at least one operation control member configured to control the rotation of the rotation member, and at least one drive member configured to drive the operation control member,
wherein the operation control member includes a rotation stop portion, wherein the rotation stop portion is configured to come in contact with the flat surface of the rotation member and stop rotation of the rotation member, and a rotation allowable portion provided in a position adjacent to the rotation stop portion, wherein the rotation allowable portion is configured to allow the rotation of the rotation member.

2. The seatbelt retractor according to claim 1, wherein the first energy absorbing mechanism and the second energy absorbing mechanism are configured for different limit loads.

3. The seatbelt retractor according to claim 1, wherein the drive member includes a gas generator configured to activate the operation control member.

4. The seatbelt retractor according to claim 1, wherein each of first energy absorbing mechanism and the second energy absorbing mechanism includes an operation control member and a driver member, wherein the first energy absorbing mechanism and the second energy absorbing mechanism are configured for different limit loads and one of the first and second energy absorbing mechanisms can always be activated in an emergency.

5. The seat belt retractor according to claim 1, wherein the rotation stop portion includes a flat surface that stops the rotation of the second energy-absorbing-member support member by coming into contact with the flat surface of the second energy-absorbing-member support member when the flat surface of the second energy-absorbing-member support member is opposed thereto, wherein the rotation allowable portion is arc shaped and configured so that rotation of the second energy-absorbing-member support member is allowed when the rotation allowable portion is located at the second energy-absorbing-member support member.

6. The seat belt retractor according to claim 1, wherein the second energy-absorbing-member support member is columnar or cylindrical and has one or two flat surfaces on the outer circumference thereof.

7. The seat belt retractor according to claim 1, wherein the operation control member is configured to stop the rotation of the second energy-absorbing-member support member with the rotation stop portion while the operation control member is inoperative and allows the rotation of the second energy-absorbing-member support member with the rotation allowable portion while the operation control member is operative.

8. The seatbelt retractor according to claim 1, wherein each of first energy absorbing mechanism and the second energy absorbing mechanism includes an operation control member and a driver member.

9. The seatbelt retractor according to claim 1, wherein the energy absorbing member is made of a belt-like plate.

10. The seatbelt retractor according to claim 1, wherein the limit-load setting device includes only one operation control member and only one drive member.

11. The seatbelt retractor according to claim 1, wherein one of the first and second energy absorbing mechanisms includes an operation control member that is fixed in one state with the rotation member.

12. The seatbelt retractor according to claim 1, wherein the operation control member is fixed in a state that always performs energy absorption.

13. The seatbelt retractor according to claim 2, wherein the first and second energy absorbing mechanisms are configured to produce four different energy absorption operation patterns for the limit-load setting device.

14. The seatbelt retractor according to claim 4, wherein the drive member of the other of the first energy absorbing mechanism and the second energy absorbing mechanism includes a gas generator configured to activate the operation control member.

15. A seat belt retractor, comprising:

a spool configured to retract a seatbelt, a locking mechanism including a locking member that rotates normally with the spool by transmission of rotation of the spool via a rotation transmission shaft and stops the rotation in the seatbelt extracting direction in an emergency, and first and second seatbelt-load limit mechanisms configured to limit the load applied to the seatbelt when the rotation of the locking member in the seatbelt extracting direction is stopped and the spool rotates relative to the locking member in the seatbelt extracting direction, wherein the first seatbelt-load limit mechanism is one of:

a load limit mechanism in which a torsion bar disposed between the spool and the locking member and constructing the rotation transmission shaft is twisted into deformation, a load limit mechanism in which a wire rod provided on one of the spool side and the locking member side is rubbed with an engage pin provided on the other of the spool side and the locking member side, a load limit mechanism in which a belt-like plate one end of which is provided on one of the spool side and the locking member side is forced to be deformed by a guide groove provided on the other of the spool side and the locking member side, a load limit mechanism in which a cylinder provided on one of the spool side and the locking member side is elastically deformed by a retaining portion provided on the other of the spool side and the locking member side, a load limit mechanism in which a U-shaped flat plate material or a U-shaped wire rod is deformed, one end of which is provided on one of the spool side and the locking member side and the other end is in engagement with the other of the spool side and the locking member side, a load limit mechanism in which a shear pin provided between the spool and the locking member is sheared, an EA mechanism in which a portion provided on one of the spool side and the locking member side is cut with a cutting edge provided on the other of the spool side and the locking member side, and a load limit mechanism in which a plate-like energy absorbing member provided on one of the spool side and the locking member side is cut with a cutting projection provided on the other of the spool side and the locking member side, wherein the second seatbelt-load limit mechanism is provided on a rotation shaft that is rotated by the rotation of the spool in an emergency; wherein the second seatbelt-load limit mechanism includes a limit-load setting device configured to set a limit load for the seatbelt and a limit-load control device configured to control the limit-load setting device so as to vary the limit load of the seatbelt in an emergency depending on the situation of the emergency, wherein the limit-load setting device includes a first energy-absorbing-member support member provided on the rotation shaft such that it can rotate therewith, a second energy-absorbing-member support member provided on the rotation shaft such that it can rotate relative thereto, an energy absorbing member disposed between the first and second energy-absorbing-member support members, wherein the energy absorbing member is configured to absorb energy during the relative rotation of the first and second energy-absorbing-member support members, and a brake system that controls the rotation of the second energy-absorbing-member support member, wherein the brake system includes a rotation member having at least one flat surface on the outer circumference, an operation control member configured to control the rotation of the rotation member, and a drive member configured to drive the operation control member, wherein the operation control member includes a rotation stop portion positioned at the rotation member to come in contact with the flat surface of the rotation member, wherein the rotation stop portion is configured to stop the rotation of the rotation member, and a rotation allowable portion provided in a position adjacent to the rotation stop portion and located at the rotation member to allow the rotation of the rotation member;

wherein the second energy-absorbing-member support member is the rotation member;

wherein the second energy-absorbing-member support member is in the form of a rectangular column or a rectangular cylinder and has at least one flat surface on the outer circumference thereof.

16. A seatbelt systems, comprising: a seat belt webbing, wherein the webbing is connected to a seat belt retractor, wherein the seat belt retractor comprises:

a spool configured to retract the webbing, a locking mechanism including a locking member configured to rotate normally with the spool by the transmission of the rotation of the spool via a rotation transmission shaft and stop the rotation in the seatbelt extracting direction in an emergency, and first and second seatbelt-load limit mechanisms configured to limit the load applied to the seatbelt when the rotation of the locking member in the seatbelt extracting direction is stopped and the spool rotates relative to the locking member in the seatbelt extracting direction, wherein the first seatbelt-load limit mechanism is a torsion bar disposed between the spool and the locking member, wherein the torsion bar is configured to be twisted into deformation, wherein the rotation transmission shaft is formed by the torsion bar, wherein the second seatbelt-load limit mechanism is provided on a second rotation shaft that is rotated by the rotation of the spool in an emergency, wherein the second rotation shaft is located parallel to the torsion bar wherein the second seatbelt-load limit mechanism includes a limit-load setting device configured to set a limit load for the seatbelt and a limit-load control device configured to control the limit-load setting device so as to vary the limit load of the seatbelt in an emergency depending on the situation of the emergency, wherein the limit-load setting device includes a first energy absorbing mechanism and a second energy absorbing mechanism, wherein each of the first and second energy absorbing mechanisms includes a first energy-absorbing-member support member provided on the rotation shaft such that it can rotate therewith, a second energy-absorbing-member support member provided on the rotation shaft such that it can rotate relative thereto, an energy absorbing member disposed between the first and second energy-absorbing-member support members, wherein energy absorbing member is configured to absorb energy during relative rotation between the first and second energy-absorbing-member support members, and a brake system that controls the rotation of the second energy-absorbing-member support member, wherein the brake system includes at least one rotation member having at least one flat surface on the outer circumference, wherein the second energy-absorbing member support member is the rotation member, at least one operation control member configured to control the rotation of the rotation member, and at least one drive member configured to drive the operation control member, wherein the operation control member includes a rotation stop portion, wherein the rotation stop portion is configured to come in contact with the flat surface of the rotation member and stop the rotation of the rotation member, and a rotation allowable portion provided in a position adjacent to the rotation stop portion, wherein the rotation allowable portion is configured to allow the rotation of the rotation member.

17. The seatbelt retractor according to claim 16, wherein the first energy absorbing mechanism and the second energy absorbing mechanism are configured for different limit loads.

18. The seatbelt retractor according to claim 16, wherein the drive member includes a gas generator configured to activate the operation control member.

19. The seatbelt retractor according to claim 16, wherein each of first energy absorbing mechanism and the second energy absorbing mechanism includes an operation control member and a driver member, wherein the first energy absorbing mechanism and the second energy absorbing mechanism are configured for different limit loads and one of the first and second energy absorbing mechanisms can always be activated in an emergency.

20. The seatbelt retractor according to claim 19, wherein the drive member of the other of the first energy absorbing mechanism and the second energy absorbing mechanism includes a gas generator configured to activate the operation control member.

21. The seatbelt retractor according to claim 9, wherein the energy absorbing member includes a first end connected to the first energy-absorbing-member support and a second end connected to the second energy-absorbing-member support.

* * * * *